(12) United States Patent
Calley

(10) Patent No.: US 8,018,081 B2
(45) Date of Patent: Sep. 13, 2011

(54) WIND TURBINE AND METHOD OF MANUFACTURE

(75) Inventor: David Gregory Calley, Flagstaff, AZ (US)

(73) Assignee: Southwest Windpower, Inc., Flagstaff, AZ (US)

( * ) Notice: Subject to any disclaimer, the term of this patent is extended or adjusted under 35 U.S.C. 154(b) by 0 days.

(21) Appl. No.: 11/487,392

(22) Filed: Jul. 17, 2006

(65) Prior Publication Data
US 2007/0013194 A1    Jan. 18, 2007

Related U.S. Application Data

(60) Provisional application No. 60/699,940, filed on Jul. 15, 2005.

(51) Int. Cl.
*H02P 9/00* (2006.01)
(52) U.S. Cl. .......................................................... 290/44
(58) Field of Classification Search ...................... 290/44
See application file for complete search history.

(56) References Cited

U.S. PATENT DOCUMENTS

| | | | |
|---|---|---|---|
| 1,919,588 A | 7/1933 | Spencer | |
| 2,152,576 A * | 3/1939 | Weeks | 290/44 |
| 4,305,699 A | 12/1981 | Martinelli | |
| 4,368,007 A | 1/1983 | Ely | |
| 4,427,897 A * | 1/1984 | Migliori | 290/44 |
| 4,797,602 A | 1/1989 | West | |
| 4,825,139 A * | 4/1989 | Hamelin et al. | 322/90 |
| 4,908,565 A * | 3/1990 | Cook et al. | 322/10 |
| 5,254,876 A | 10/1993 | Hickey | |
| 5,304,883 A | 4/1994 | Denk | |
| 5,793,625 A * | 8/1998 | Balogh | 363/89 |
| 5,946,202 A * | 8/1999 | Balogh | 363/26 |
| 6,239,996 B1 * | 5/2001 | Perreault et al. | 363/89 |
| 6,330,170 B1 * | 12/2001 | Wang et al. | 363/37 |
| 6,353,307 B1 * | 3/2002 | Koelle et al. | 322/59 |
| 6,359,421 B1 * | 3/2002 | Mueller et al. | 322/20 |
| 6,366,064 B1 * | 4/2002 | Reichard | 323/224 |
| 6,457,943 B1 | 10/2002 | Olsen | |
| 6,487,096 B1 * | 11/2002 | Gilbreth et al. | 363/35 |

(Continued)

FOREIGN PATENT DOCUMENTS

DE       29912737       7/1999

(Continued)

OTHER PUBLICATIONS

Official Notification of Examination Results dated Feb. 25, 2011, Russian Application No. 2008105746.

(Continued)

*Primary Examiner* — Joseph Waks
(74) *Attorney, Agent, or Firm* — Snell & Wilmer LLP

(57) ABSTRACT

A variable voltage and frequency output wind turbine. Variations of the wind turbine include use of a slotless alternator to reduce alternator noise, a high power AC output to facilitate transmission of the output over extended distances, AC to DC converters and DC to AC converters, and sensors for systems and devices to receive the wind turbine output and to allow matching of the output to the receiving devices and system. Other features include a removable hatchcover for dissipating heat from components contained in the turbine or attached to the hatchcover, a swept blade design to reduce blade-produced noise, and power storage components for storing and intermittently using energy stored as a result of wind turbine power generation.

34 Claims, 21 Drawing Sheets

U.S. PATENT DOCUMENTS

| | | | |
|---|---|---|---|
| 6,676,122 B1 * | 1/2004 | Wobben | 290/55 |
| 6,700,804 B1 * | 3/2004 | Reichard | 363/51 |
| 6,703,718 B2 * | 3/2004 | Calley et al. | 290/44 |
| 6,803,748 B2 * | 10/2004 | Peter | 322/29 |
| 6,850,426 B2 * | 2/2005 | Kojori et al. | 363/123 |
| 6,856,038 B2 * | 2/2005 | Rebsdorf et al. | 290/44 |
| 6,924,991 B2 * | 8/2005 | Skeist et al. | 363/21.02 |
| 6,954,004 B2 * | 10/2005 | Skeist et al. | 290/44 |
| 6,975,045 B2 | 12/2005 | Kurachi et al. | |
| 7,012,409 B2 * | 3/2006 | Schreiber et al. | 323/207 |
| 7,018,167 B2 | 3/2006 | Yoshida | |
| 7,042,110 B2 * | 5/2006 | Mikhail et al. | 290/44 |
| 7,102,251 B2 * | 9/2006 | West | 307/64 |
| 7,239,036 B2 * | 7/2007 | D'Atre et al. | 290/44 |
| 2003/0071467 A1 * | 4/2003 | Calley et al. | 290/44 |
| 2003/0116262 A1 | 6/2003 | Stiesdal | |
| 2004/0026929 A1 | 2/2004 | Rebsdorf | |
| 2004/0067136 A1 | 4/2004 | Roberts | |
| 2004/0247437 A1 | 12/2004 | Otaki | |
| 2005/0046397 A1 * | 3/2005 | Peter | 322/44 |
| 2005/0162018 A1 * | 7/2005 | Realmuto et al. | 307/44 |
| 2007/0170724 A1 * | 7/2007 | Calley | 290/44 |
| 2007/0267874 A1 * | 11/2007 | Taylor et al. | 290/55 |

FOREIGN PATENT DOCUMENTS

| | | | |
|---|---|---|---|
| JP | 2000035805 A * | 2/2000 | |
| JP | 2002272049 | 9/2002 | |
| WO | 9519500 | 7/1995 | |
| WO | WO 2007003183 A1 * | 1/2007 | |

OTHER PUBLICATIONS

USPTO; Non Final OA Dated Sep. 7, 2010 in U.S. Appl. No. 12/683,577.
USPTO; Final OA Dated Jan. 4, 2011 in U.S. Appl. No. 12/683,577.
CN; First OA Dated Nov. 2009 in Application No. 200680033908.6.
PCT; ISR and WO Dated Jul. 5, 2007 in App No. PCT/US/2006/027659.
PCT; IPRP Dated Jan. 24, 2008 in App No. PCT/US/2006/027659.
NZ; Examination Report Dated Sep. 11, 2009 in App No. 565921.
AU; Examiner's First Report Dated Mar. 9, 2010 in App No. 2006270023.
IL; Examiner's Announcement Dated Feb. 2011 in App No. 188755.

* cited by examiner

Islanding all electrically conductive components eliminates shorting (arcing).

WIND TURBINE AND METHOD OF MANUFACTURE

This application claims priority to applicant's copending U.S. Provisional Patent Application No. 60/699,940 titled "UNIVERSAL WIND TURBINE" filed Jul. 15, 2005, the entirety of which is incorporated herein by reference.

BACKGROUND OF THE INVENTION

1. Field of the Invention

The invention relates to the field of wind turbine power generation, and in particular to a wind turbine that can be utilized on a utility grid, that is able to provide a wide range of frequency and voltage output, that can be used as a stand-alone power source, and that includes manufacturing and distribution cost and noise reduction features that increase the range of applications.

2. Background of the Related Art

Small-scale wind turbines are in wide and growing use. Small-scale wind turbines are typically used to charge battery banks or to feed power into utility lines. Present wind turbines, however, typically have several weaknesses. They often lack versatility and durability, perform below needed performance levels, fail to provide sufficient cost-effectiveness, and generate unacceptable levels of audible noise. If these benefits were realized, the result would be a turbine that is more attractive for residential and other uses.

For example, one weakness with prior art turbines is their limited ability to perform multiple functions or to be used for a wide range of applications. One turbine design can be used for grid-connected operation. Another design can charge a battery bank for backup to the grid. A third design could be used without the grid as the solitary powering device. However, a different method of connection for each wind generator is required for these uses. Also, depending on the specific application (e.g., to provide a battery bank for stand-alone use), the turbine design often needs to be modified for site-specific conditions (e.g., to provide power at a selected voltage). As a result, prior art wind turbines, which are typically not capable of use in a wide variety of settings, require the manufacturer to stock and distribute a wide variety of wind turbine designs, thereby also complicating manufacturing and inventory logistics.

Another weakness of prior art turbines is the cost and sub-optimal performance of the alternator typically used. Prior art alternators typically contain slots of steel that hold a number of copper windings, which, in connection with the use of permanent magnets, convert the energy of the wind to electrical output. In the prior art design, the slots have often tended to vibrate when in operation. The vibration produces an unacceptable noise and a cogging torque that prevents the wind turbine from starting up or interferes with startup in lower winds. Additionally, prior art alternators typically have low stall torque and high manufacturing costs. A new alternator design is needed that eliminates unnecessary vibrations, increases the stall torque, and decreases manufacturing costs.

Capacitors incur another cost and reliability problem for the single-phase inverters typically used with prior art generators. The main capacitors in prior art turbines are required for storing energy for the oscillating 50 or 60 Hz power level typically produced. However, capacitors add a costly element to the turbine, one that may need replacement or repair over the life of the generator. A system is needed that can use, for example, the kinetic energy of the rotating blades to store energy. Such a kinetic system would increase the life and decrease the cost of the wind turbine system.

In addition, prior art rotor blades in down-wind turbines often generate undesired audible noise during blade rotation. For example, a thump may sound as each blade enters the plane downwind from the turbine's tower, where it experiences a momentary decrease in wind speed. When the rotor turns quickly, many audible thumps are generated, producing undesirable noise. An improved blade design is needed to reduce the sound of the thump, especially for residential areas.

SUMMARY OF THE INVENTION

The present invention addresses the needs and weaknesses identified above, as well as others, to provide a wind turbine having reduced noise, cost, and inefficiency compared to the prior art. Embodiments of the wind turbine of the present invention also include specialized housing and blades designs to reduce audible noise. The present invention further relates to a specialized power output device, such as an alternator, that is usable to provide power for other, non-wind power applications, such as vehicles (e.g., bicycles, automobiles).

The turbine of the present invention provides power at a relatively high voltage level (e.g., around 100 V or 200 V or more, compared with the typical 12, 24, 36, or 48 VDC output of small prior art wind turbines), thereby allowing the wind turbine to be located remotely from a load that it is serving, without significant electrical losses. A backup battery or a DC load can be connected to the power output from the wind turbine by interfacing such a component through a device for producing an appropriate output, if necessary, such as a bi-directional inverter that allows power to flow out and into the inverter and, as appropriate, back to the supply (e.g., the battery), as is typical for inverters designed to run, among other things, inductive loads, that could cause voltage spikes if the inverter were not capable of absorbing power and directing such power back to the battery. For example, a battery can be connected to the wind turbine that is separate from the turbine system (e.g., for use for separate storage of energy), a battery can be connected as backup to the grid (e.g., as a battery backup for residential use, in the event of loss of turbine output), or a load can be connected without the use of a battery. When connected to a battery, excess power can be stored until a time when the load is higher than the wind turbine output, for example. Other DC and AC loads may similarly be connected to the output of the wind turbine, including a pump, a compressor, a heater, a cathodic protection device, a DC to DC converter, an electrolizer, and/or a transformer.

In one potential application of the present invention, the wind turbine is connected only to a DC load. In prior art wind turbines, the electrical power from the wind turbine was delivered to the load as relatively low voltage DC power. In some embodiments of the present invention, power is transmitted from the wind turbine to the load as relatively high voltage AC power. In this variation of the present invention, a rectifier or other AC to DC converter can be provided in a location physically near the DC load, so as to vary frequency to optimize transformer efficiency and cost.

Since power in this variation is transmitted as high voltage AC power, a transformer or other voltage conversion device can be used to convert the voltage to a level that is appropriate for the DC load. In this way, any electrical losses associated with transmitting power from the wind turbine to the load can be minimized. However, additional losses can result from the use of a transformer. At low power levels, core losses dominate for the transformer, whereas current related losses for the transformer dominate at high power levels. The overall transformer losses can be minimized by utilizing a DC to AC converter, such as an inverter, so as to produce output of the wind turbine at variable frequency, depending on the power level. At low power levels, when core losses from the transformer dominate, the frequency of the output device can be set lower, so as to offset these losses. At high power levels, the frequency of the output device can be increased, thereby minimizing transformer current related losses.

The alternator in one embodiment of the present invention has a generally radial shape and includes a winding portion and a rotor portion. The winding portion includes coil windings formed from flat conductor material and emplaced around a core of magnetic flux conducting material. The rotor portion includes permanent magnets are attached to a rim, or the rotor otherwise produces magnetic fields (e.g., magnetic fields are generated by, or created upon a portion or portions of, the rotor). In some embodiments, the rim comprises a magnetic flux conducting material, such as a ferrous material. This variation eliminates or greatly reduces the audible noise of vibrating slots of the prior art and is capable of producing much greater stall torque over prior art alternators (e.g., approximately double the stall torque of some prior art generators has been achieved). The new alternator design also reduces or eliminates cogging torque at startup.

Another benefit of the alternator of this embodiment (also interchangeably referred to herein as the "radial, slotless alternator") is the low manufacturing cost. The conductor coils are wound on a manufacturing machine and located peripherally to a magnetic field emitting rotor upon final assembly. The manufacturing reproducibility of the design of the radial, slotless alternator is therefore inexpensive. Although the radial, slotless alternator is one embodiment of the present invention, other alternator designs would still operate well, in conjunction with the rest of the invention.

An embodiment of the present invention makes use of a boost alternator system described in U.S. Pat. No. 6,730,718 to Calley et al., titled "WIND TURBINE CONTROLLER," the entirety of which is incorporated herein by reference. With the boost alternator, a switching device, such as a field effect transistor (FET) or an insulated gate bipolar transistor (IGBT), along with at least one diode, momentarily shorts each alternator winding to allow energy storage within the internal inductance of the alternator. When the switching device reopens, the energy stored in the alternator's inductance is released, temporarily boosting the output voltage. The present invention incorporates a variation of the device described in U.S. Pat. No. 6,730,718 by providing a switch for shorting on either the AC or DC side of the rectifier to achieve a boost mode function. The boost mode feature is incorporated in some embodiments of the present invention.

Embodiments of the present invention include one or more sensors and appropriate signal processing capabilities to allow detection of the voltage and frequency of the system or device to which output is to be provided, or to provide other sensed input, such as blade revolution per minute (RPM), wind speed, or power output. Based upon the sensed characteristics of the system or device to which output is to be provided, as determined, for example, by a controller, output is adjusted appropriately so as to allow integration with and operation at the appropriate voltage and frequency of the system or device to which the output is to be delivered. The universal capabilities of this feature simplify the manufacturing and distribution of the wind turbine because a single system can be manufactured and sold to operate with a wide range of electrical grids and other applications. A single controller may also control multiple turbines or portions thereof.

One embodiment involves installation of a DC to AC converter, such as an inverter, and controller within a housing, such as a nacelle of cast metal (such as aluminum) or other suitable material. This arrangement reduces the cost and utilizes the inductance of the windings of the alternator instead of necessitating use of a separate and costly inductor. Die-cast aluminum or another highly heat-conductive material is used, and the DC to AC converter and controller are located just inside of one end of the housing so that air or other fluid outside of the housing enhances heat dissipation from these devices. Another advantage of locating these and other features within the housing is that effects of electromagnetic interference (EMI) and physical and other vulnerabilities are minimized or reduced. By locating control circuitry close to the turbine, such as inside the housing and before slip rings or other power transmission components, including connecting lines and other physically or electrically vulnerable or EMI-emitting features, potential for interference with transmission is greatly reduced.

Among other things, the present invention reduces or eliminates the need for capacitors for single-phase inverters typically used with prior art generators for storing energy for the oscillating 50 or 60 Hz power level typically produced. The present invention is able to use the kinetic energy of the rotating blades to store energy to perform the functions typically performed by such capacitors used with prior art generators. In one embodiment, the stored energy is further usable to correct power factor (e.g., provide volt amps reactive, also referred to herein as "VARs") when supplying output to a power grid or other load. In some embodiments, for this application a bi-directional inverter is used with the present invention.

In one embodiment, the housing includes features for attachment of the DC to AC converter and controller to a removable hatchcover. As air flows around the heat-conductive housing, the heat generated by the devices is drawn away from the inverter inside, thereby cooling the system, without necessitating the use of additional fans or other cooling equipment. Another benefit of using a casing made of a conductive metal or other similarly propertied material is that the casing thereby reduces electromagnetic interference with regard to the equipment shielded thereby. Although this variation provides one possible housing design for the present invention, the present invention typically will operate without these housing design features. The invention will also typically operate with housings of various shapes, sizes or materials, including housings having a tail-vane.

The blades in the present invention are designed to reduce undesired noise associated with operation of prior art (downwind) wind generators. Unlike prior art devices, the blades in the present invention have a curved tip. As a result, in operation, the root of the blade enters the downwind cross section of the tower first, with the rest of the blade gradually passing the tower, followed lastly by the blade's tip. The phased entrance of the blade into the cross section of the tower reduces tonal noise because the portion of the blade that is entering or exiting the tower cross section at any given moment in time is minimized. The blades of one embodiment are made of glass reinforced polyester, which can be multi-part compression molded and made with a multi-part injection mold, for example. Forming the blades using this material allows for a consistent quality and high-volume production. However, the blades may also be made using other durable materials and may not necessarily be created with multi-part injection molds. The present invention also allows for other blade styles to be used in conjunction with the other invention features.

A two-part injection or compression molded blade may be used, for example, in which two parts of the blade include a lifting side and a pressure side. By separating the blade in this manner, rather than along the length of the blade, for example, as in some prior art, the blade may be "cored out" so that the blade is lighter (e.g., have unnecessary material removed) so that the wall thickness can be consistent. Ribbing can be added to provide greater strength and greater bond area.

Additional advantages and novel features of the invention will be set forth in part in the description that follows, and in part will become more apparent to those skilled in the art upon examination of the following or upon learning by practice of the invention.

BRIEF DESCRIPTION OF THE DRAWINGS

The above listed and other features and advantages of the present invention, will be apparent from the Detailed Description in conjunction with the accompanying drawings, in which.

DETAILED DESCRIPTION OF THE INVENTION

Figure 1:
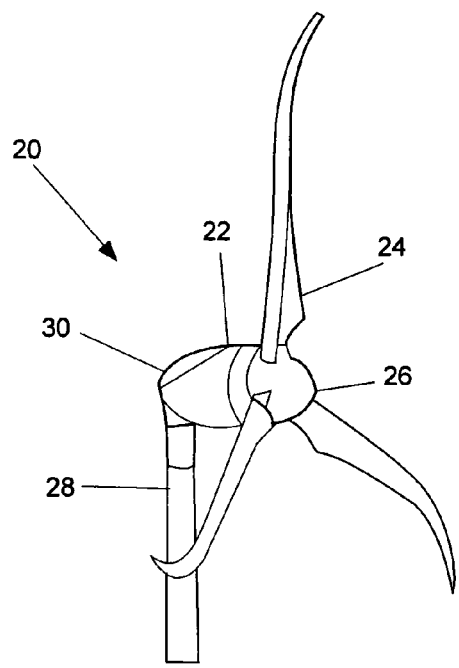
FIG. 1 is an exemplary wind turbine according to an embodiment of the present invention.

FIG. 1 shows an exemplary wind turbine 20 having three blades 24, a housing 22, and attachment to a tower 28, in accordance with an embodiment of the present invention. The embodiment of the wind turbine 20 shown in FIG. 1 is attached to a monopole tower 28. Although three blades are shown in the variation of FIG. 1, different numbers of blades 24 are usable with the present invention. Additionally, many forms of tower arrangements, including tubular towers, guyed towers, and lattice towers, as well as other turbine apparatuses and orientations will work with many aspects of the present invention. The wind turbine 20 shown in FIG. 1 is designed for battery charging or for providing residential grid-connected power. The present invention can be used with virtually any size wind turbine and for a wide range of powering purposes.

The blades 24 are mounted to a hub 38 (see FIG. 2), which is housed within a nosecone 26 for rotation therewith. The blades 24 may optionally be formed individually and then attached to the hub 38, or they may be formed integral with the hub 38 as a single component. In one embodiment, the blades 24 are secured to a 2-plate hub 38. The nosecone 26 may comprise a separate component attached to the hub 38, or it may be formed integral with the hub. The hub 38 may also be omitted entirely with some variations of the present invention.

Figure 2:
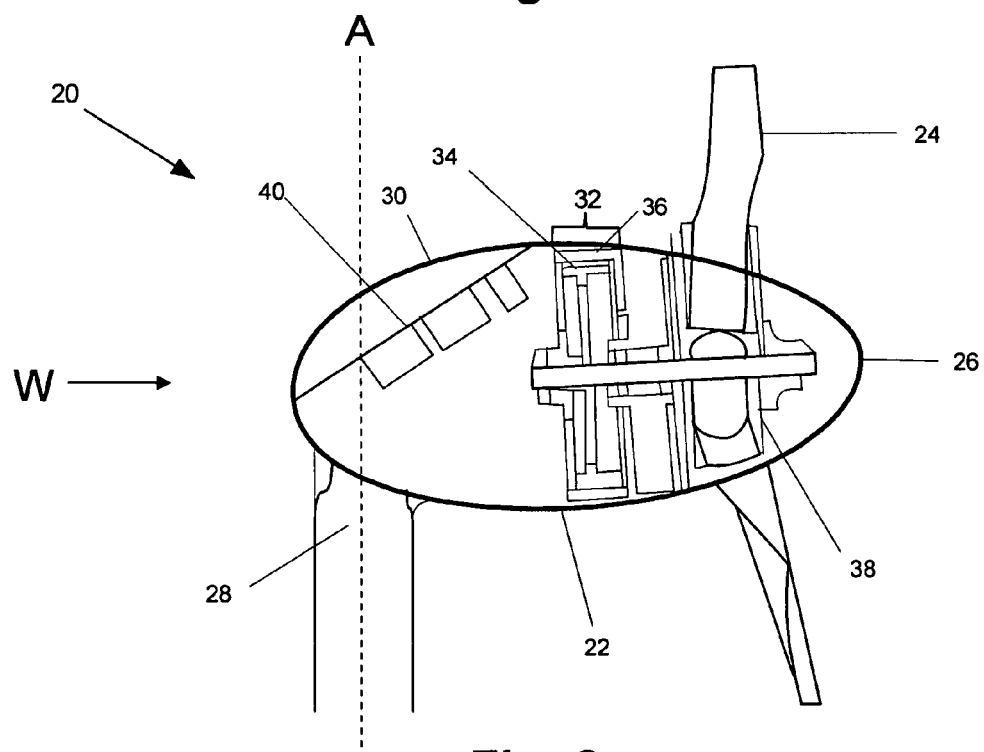
FIG. 2 is a sectional view of an exemplary wind turbine according to an embodiment of the present invention.

The pitch angle of the blades 24 relative to the hub 38 may be fixed, although embodiments of the present invention can function with variable pitch blades. The hub 38 is mounted onto or emplaced near a cast or otherwise formed housing 22. In some embodiments, the hub 38 or a shaft attached thereto engages the housing 22, such as via bearings, bushings, or other suitable minimal frictional engagement mechanism. The housing 22 of one embodiment is attached to the tower 28 by, for example, a clamp-on yaw assembly bearing that allows the housing 22 to rotate about a vertical axis A, such that the wind turbine 20 is able to adjust appropriately to changing wind direction. In the embodiment of FIG. 2, the housing 22 is automatically oriented relative to the wind direction because of the rotor's downwind configuration, whereby wind flow across the angled surfaces of the blades 24 orients the turbine 20 relative to wind flow direction W, and the body of the housing 22 thereby orients with the blades 24 relative to wind flow direction W. While one embodiment incorporates the clamp-on yaw bearing design, a wind turbine that uses other features to orient the housing 22, such as a tail vane or an active yaw drive, may also be used with the present invention.

As further described below in conjunction with FIGS. 15A-15G, an exemplary yaw assembly includes a junction box yaw with vibration/shock features, in accordance with an embodiment of the present invention. Among other things, the yaw assembly prevents or reduces transmittal or generation of noise in the tower as a result of operation of the turbine. The yaw assembly includes slip connection features, such as one or more wafer slip rings and separators therebetween, with the slip connection features being soldered or otherwise attached directly to a printed circuit board (PCB) or other circuit device. Brushes are supported and actuated vertically to make upward contact with the slip connection features, upon assembly and installation. As the brush wears, conductive particles are removed form the brush due to wear. Vertical placement of the brush allows the particles to fall onto an isolated surface below the brushes, thereby reducing or eliminating the potential for an electrical short (arc). In one embodiment, the yaw assembly includes one or more rigid coupling devices, such as rigid industrial connecting tubes located between the external terminal lug and the internal brush lead assembly. In the prior art, wires tightly packed within the yaw junction box could wearably abrade as the wire insulation made contact with the walls of the yaw housing, but in embodiment of the present invention, use of rigid coupling devices reduces or eliminates insulation abrasion damage and such potential shorting.

The yaw assembly of embodiments of the present invention includes vibration/shock attenuation features. Factors contributing to vibration produced by the turbine can include out of balance rotating components, uneven air gap and electrical imbalance, change in temperature, and material resonance and defects. The vibration/shock attenuation features absorb and thereby reduce such vibration and transmission thereof to other wind turbine features, such as the tower.

As shown in FIG. 2, the housing 22 of one embodiment has a removable hatchcover 30 at the tail at the upwind end of the housing 22. The cover 30 of one embodiment is removable from the housing 22, such as for maintenance of electronic and mechanical components housed within the housing 22. Although the embodiment of FIG. 2 makes use of this removable hatchcover design 30, embodiments of the wind turbine 20 will operate without the removable hatchcover 30, or with a removable hatchcover placed elsewhere upon the housing 22. The hatchcover 30 may be any suitable size or shape.

As shown in FIG. 2, the wind turbine 20 generates power via an electrical output device 32, such as an alternator or a generator. The electrical output device 32 of some embodiments includes a rotor 34 and a slotless stator 36. The stator 36, for example, is comprised of steel or another suitable core material and copper (or other electrically conductive material) windings. The stator 36 in the embodiment of FIG. 2 is maintained in a fixed position relative to the rotor 34, such as via attachment to the housing 22. The rotor 34 rotates with rotation of the blades 24. The rotor 34 generates a varying magnetic field, such as through rotation of permanent magnets or other magnetic elements incorporated in or attached to the rotor 34. The use of permanent magnets in these embodiments is especially useful in small-scale wind turbines, such as those used for battery charging and residential power. The stator 36 of the turbine 20 shown in FIG. 2 is slotless and comprises a low loss core, such as a core having one or more laminations layers (e.g., plates of steel or other suitable material, also interchangeably referred to herein as "stacks") or comprising other eddy current reducing material, such as ferrous material, with a copper or other suitable conductor winding. When the magnetic fields of the rotor 34 are rotated relative to the windings of the stator 36, a current is induced in the windings from the resulting change in flux as the magnetic fields associated with the rotor pass the stator winding loops. Although this variation of the present invention's stator has a slotless design, the invention can be used with other stator designs and other electrical output devices. Some common stator designs contain a number of windings, typically making up three inductor portions, for three-phase output. Some aspects of the invention can function equally well with other types of power output devices, such as wound field or induction generators, instead of those using permanent magnets as sources for the rotor magnetic fields.

In the variation of the present invention shown in FIG. 2, an AC to DC converter and/or a DC to AC converter and/or other components 40 are located at one end of the housing 22 and attached to the removable hatchcover 30 to maximize the cooling effects of air or other fluid (e.g., cooling water) flowing about or otherwise heat exchangeably interacting with the housing 22. As the wind passes the housing 22, for example, heat generated from the hatchcover components 40 of the wind turbine 20 is drawn away. In some embodiments, the hatchcover 30 is formed from a highly heat-conductive material, such as aluminum, and the hatchcover components 40 are placed in direct contact with the hatchcover 30 to facilitate heat transfer. While the hatchcover components 40 of the exemplary embodiment of FIG. 2 are placed at the leading end of the housing 22 relative to wind direction W for maximum cooling benefit, the hatchcover components 40 may be placed at other locations within the housing 22 and still receive sufficient cooling.

Attached to the hub 38 are the blades 24. In the present invention, the blades 24 are of a tapered, twisted, and curved design to maximize energy capture and minimize noise, as discussed further below. Although one embodiment uses this design, the invention will work with other blade designs.

Figure 3:
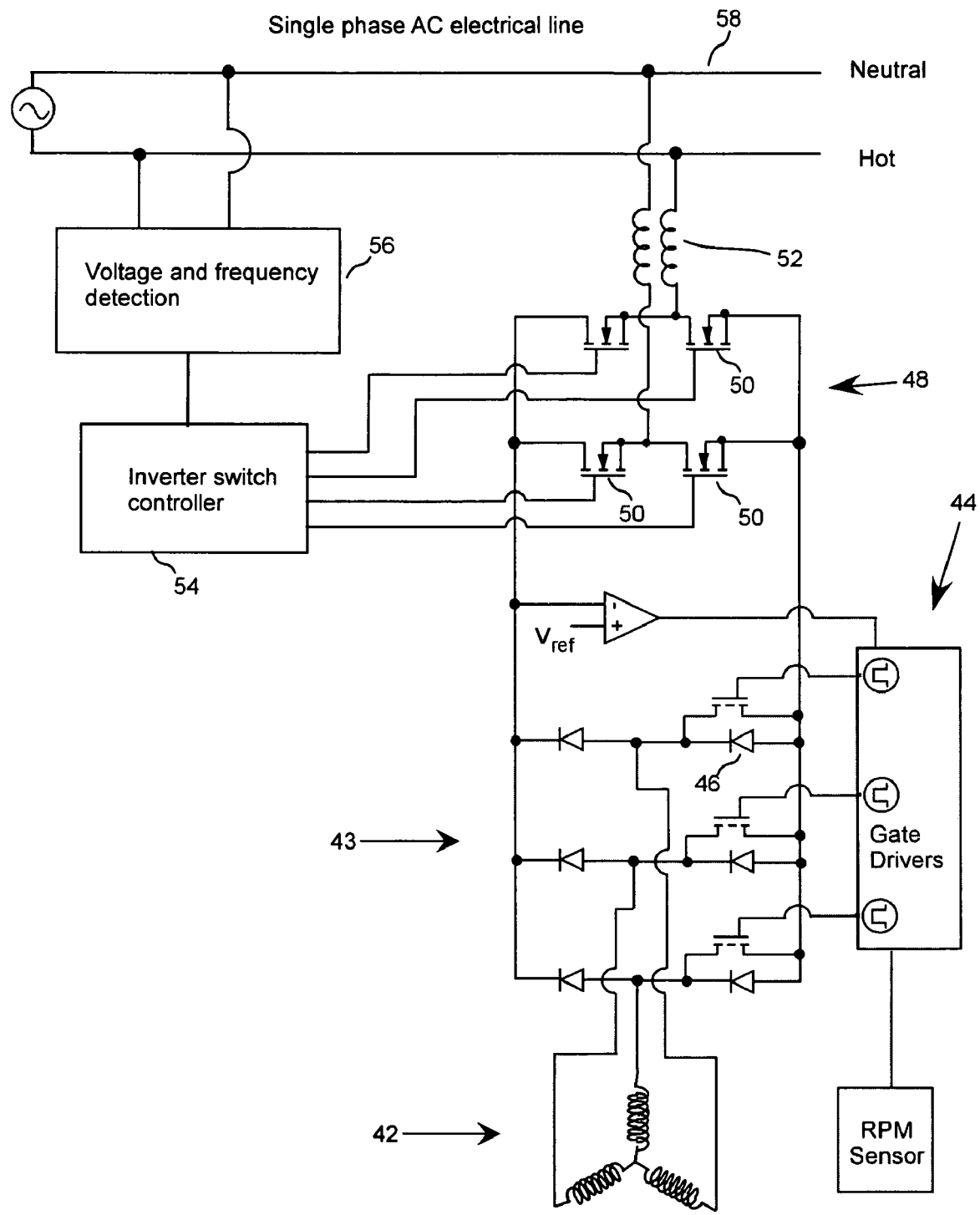
FIG. 3 is a representative diagram of an exemplary inverter usable with embodiments of the present invention.

FIG. 3 shows a representative diagram of exemplary output conversion features for use with wind turbines in accordance with some embodiments of the present invention. In FIG. 3, the wind turbine's alternator 42 generates AC output at a varying frequency and voltage. The AC output from the alternator 42 is passed through an AC to DC converter 43, such as a rectifier, that includes one or more diodes 46. It should be noted that the exemplary AC to DC converter 43b shown is a passive rectifier based on diodes, but other rectifiers or other circuits, such as bridges, can be used with the present invention to perform similar functions. A boost mode controller 44 improves wind turbine performance in low wind conditions, eliminates the need for a boost function to be performed by the AC to DC converter, and allows the wind turbine selectively to be slowed or stopped.

The boost mode controller shown in FIG. 3 is similar to the boost mode controller described in U.S. Pat. No. 6,703,718. The output from the wind turbine of FIG. 3 is passed through a DC to AC converter 48, such as an inverter, containing one or more transistors, such as an N-type insulated gate field effect transistor (IGFET), to convert the output to AC at a selected voltage and frequency. The inverter can be of any appropriate design, one example of which is shown in FIG. 3 as including four high-speed switches 50, such as field effect transistors (FETs), insulated gate bipolar transistors (IGBTs), metal oxide semiconductor field effect transistors (MOSFETs), gate turn-off silicon controlled rectifiers (GTOs), other transistor circuits or other devices, or some combination thereof. The switches 50 are controlled appropriately to create an approximation of a sine wave output, at the appropriate voltage and frequency. In the exemplary embodiment shown in FIG. 3, the DC to AC converter 48 is a single-phase inverter for use with a single-phase electrical system. However, a multiple-phase DC to AC converter 48 can be used for other electrical systems, such as 3-phase systems or other poly phase systems. The DC to AC converter 48 may also include or be coupled with inductors 52 or other filter devices to smooth the output from the converter 48. If the switches 50 act fast enough (e.g., relative to the frequency of the output), then the harmonic content of the resulting output may be low enough to greatly reduce the need for filtering.

The switches 50 in the DC to AC converter 48 are controlled by a controller 54. The controller 54 coordinates operation of the switches 50 to produce AC output that is at the appropriate voltage and frequency for the AC line 58 or other output power receiving device or system to which the wind turbine is connected. Optionally, a voltage and frequency monitor 56 measures the voltage and frequency of the AC line 58 or other output power receiving device or system to which the wind turbine is connected, if applicable. The voltage and frequency monitor optionally also measures the phase angle of the AC signal on the power line 58 or other output power receiving device or system. The voltage and frequency monitor 56 may be implemented, for example, via a printed circuit board having appropriate filters and digital signal processing contained thereon. Other implementations of the voltage and frequency monitor 56 can also be used with the present invention.

If the turbine is set for grid connected mode (e.g., for connection to a commercial power grid), when the wind turbine according to the present invention is first connected to the AC power line 58 or other output power receiving device or system, for example, the controller 54 initially measures the voltage, frequency, and phase angle of the receiving device or system. The controller 54 uses the measurement to control the operation of the switches 50 in the DC to AC converter 48, such that the output of the wind turbine will be compatible with the AC power on the line 58 or other output power receiving device or system. A delay of up to several minutes may be required for certification or to meet legal requirements in certain jurisdictions when the wind turbine of FIG. 3 is initially operated, or as the controller 54 performs a reliable measurement of the voltage, frequency, and phase angle of the AC line 58 or other output power receiving device or system to which power is to be conducted.

The controller 54 is then synchronizes the output of the wind turbine with the power on the AC line 58 or other output power receiving device or system. Generally, standardized values for voltage and frequency are used on a typical grid AC line 58 or other standard output power receiving device or system. For instance, the frequency of a U.S. commercial grid is most likely either 50 Hz or 60 Hz, and the voltage at a residence or business is likely to be approximately a discrete value, such as 120 VAC or 240 VAC. Different countries may have other standardized voltages (for instance Japan uses 100 and 200 VAC as standard voltages at the residential and business level), but the range of typical connection voltages for grid applications is generally standardized to a few levels.

The wind turbine controller 54, in one embodiment designed to meet specific certification requirements, determines the appropriate output by, for example, comparing the monitored voltage and frequency to a table of known standard voltages and frequencies, and the wind turbine output will not be connected if the values of voltage and frequency do not fall within an acceptable tolerance of one of the standard values. By measuring voltage and frequency and by appropriately controlling the operation of the DC to AC converter 48 to match the power on the line 58 or other output power receiving device or system, it is possible to produce a single model of wind turbine that is compatible with virtually any AC residential utility grid or other device or system that is to receive the output of the turbine. Among other things, these features greatly simplify manufacturing, distribution, stocking, and marketing logistics.

Figure 4:
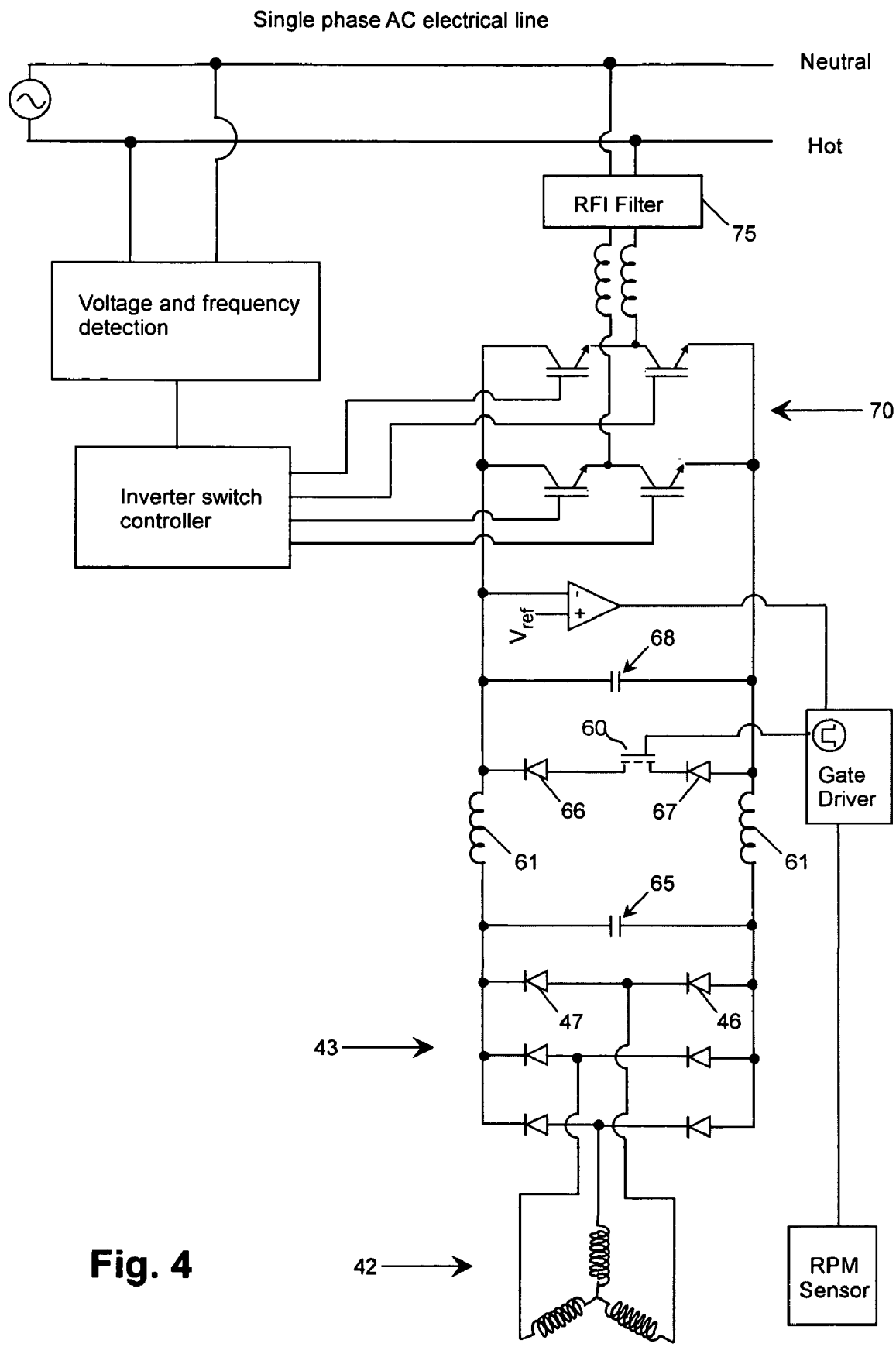
FIG. 4 is a block diagram of an exemplary inverter usable with embodiments of the present invention.

FIG. 4 shows another embodiment of a boost mode controller similar to that of FIG. 3. However, in contrast to the boost mode controller of FIG. 3, the boost mode switches are replaced with a single switch 60 that connects the DC lines connecting the AC to DC converter 43 and the DC to AC converter 70, and one or more boost inductors 61 are located between the switch 60 and at least one of the diodes of the AC to DC converter 43, such as diode 46 and/or diode 47. In addition, a capacitor or other charge storage device 65 and one or more diodes 66, 67 are located between the switch 60 and the AC to DC converter 43. Further, a capacitor of other charge storage device 65 is located between the switch 60 and the DC to AC converter 70. The DC to AC converter 70 of FIG. 4 includes differing transistors from the transistors of the DC to AC converter 48 of FIG. 3, such as bipolar junction transistors (e.g., NPN transistors). In addition, a radiofrequency interference (RFI) filter 75 is provided between the DC to AC converter 70 and the output power receiving device, such as a single phase AC electrical line.

The switch 60 in the wind turbine of FIG. 4 is operated similarly to the switches described in U.S. Pat. No. 6,703,718, in order to achieve a boost function via the DC to AC converter 70. The switch 60 can be operated to improve wind turbine performance in light winds, to increase voltage on the DC link in order to eliminate the need for a boost function in the DC to AC converter 70, and to slow or stop the wind turbine rotor. By slowing the wind turbine rotor, the switch 60 can be used to limit power output or stop the wind turbine by, for example, aerodynamic stall, as described further in Applicant's copending U.S. Provisional Patent Application No. 60/760,407, titled "STALL CONTROLLER AND BACKUP FOR A WIND TURBINE," filed Jan. 20, 2006, and the corresponding U.S. patent application thereof, titled "STALL CONTROLLER AND BACKUP FOR A WIND TURBINE," filed even herewith, the entirety of each of which is incorporated herein by reference.

Figure 5:
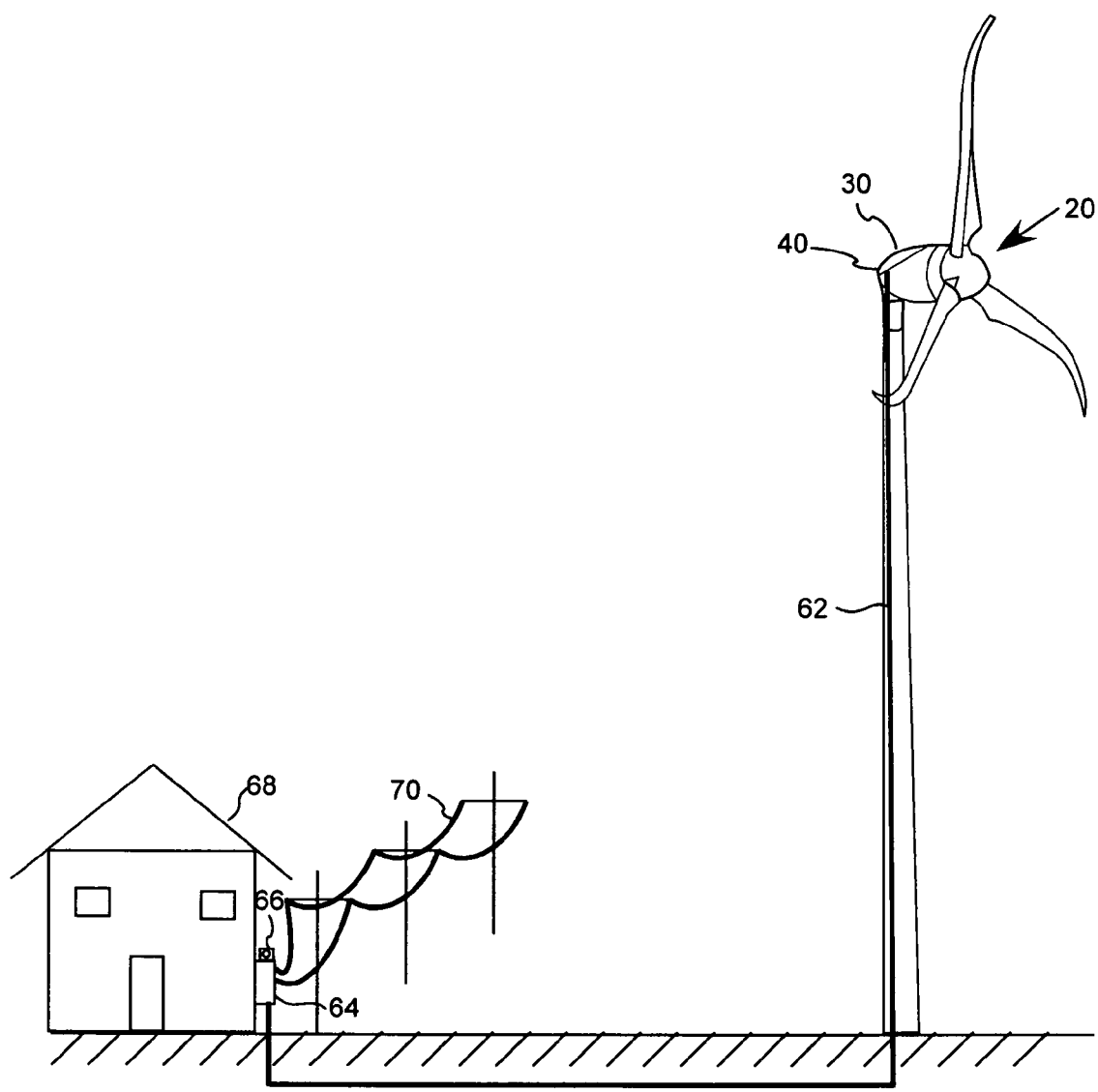
FIG. 5 shows a first configuration for connecting an exemplary wind turbine of the present invention to a load.

One exemplary connection configuration for the wind turbine of the present invention is shown in FIG. 5. The wind turbine 20 includes a hatchcover 30 on the housing, which contains an output device 40, which includes, for example, the AC to DC converter, and/or the DC to AC converter, and/or other devices and features for producing an appropriately normalized output (e.g., a DC output or an AC output at appropriate frequency and voltage). From the output device 40, a set of cables 62 or other connectors conduct power from the wind turbine tower to a point of interconnection and load. The cables 62 are shown partially as located underground between the wind turbine 20 and the interconnection point, although the cables 62 could also be routed solely above ground.

One feature of the exemplary embodiment of the present invention shown in FIG. 5 is that the output transmitted in the connection cables 62 is AC power with relatively high voltage (such as 120 or 240 VAC as an example, although other voltages are possible). Prior art wind turbines for residential use typically generate DC power with relatively low voltage (typically 12, 24, 36, or 48 VDC), and the inverter is located at or near the load or interconnection point. The result in prior art wind turbines was that the turbine needed to be placed relatively close to the load or interconnection point, in order to minimize line losses and costs in the low voltage DC cables. The present invention allows the wind turbine, which generates higher output voltage (e.g., 100 VAC to 420 VAC or more), to be placed further from the load or interconnection point, potentially at a windier location, for example, because relative electrical losses are much lower in cables 62 transmitting higher voltage output than in cables transmitting lower voltages.

At the point of interconnection (e.g., at a residence), a power panel 64 is typically provided, which may include circuit breakers or other protective equipment. A utility meter 66 may also be located at or near the power panel 64. An electrical load 68 may optionally be connected to the power cables 62 at the power panel 64. The electrical load 68 is shown in FIG. 5 as a residential load. However, any electrical load can be potentially connected via the connection cables 62. The load 68 can be resistive, inductive, capacitive, or a combination thereof, for example. Also, at the power panel, the power cables 62 may be interconnected with a utility line 70. This configuration could be used for a "net metering" situation, for example, in which a utility customer relies on the utility to provide power but utilizes a wind turbine to offset some or all of the energy that the customer uses. In some circumstances, the customer may also sell excess generated power to the local utility.

Figure 6:
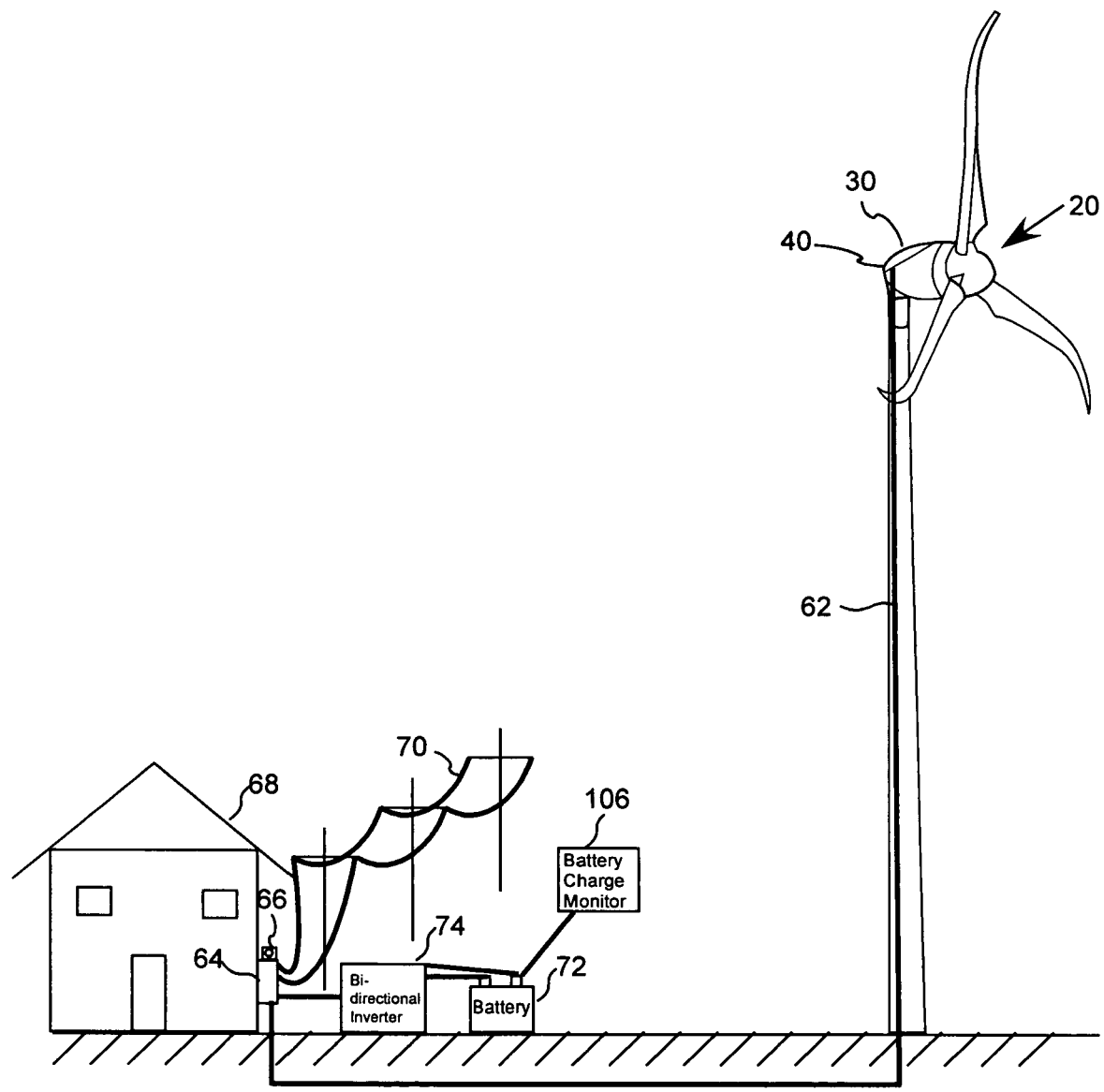
FIG. 6 shows a second configuration for connecting an exemplary wind turbine of the present invention to a load.

A second potential configuration for connecting the wind turbine according to the present invention is shown in FIG. 6. This configuration is similar to that shown in FIG. 5, except that a battery or other power storage device 72 is connected to the system for backup power when the utility grid fails. Energy stored in the storage device 72 could also be used to feed the grid or to serve the local load 68 during times when utility power prices are high, but when the wind has ceased to provide a sufficient source of power generation. In anticipation of these circumstances, the storage device 72 could be charged during periods when the wind is high or when the utility rates are low, for example. In order to connect the storage device 72 to the system to provide backup power, it is typically necessary to convert the DC output of the storage device 72 to an AC output. A bi-directional inverter 74, for example, is capable of being used to charge the storage device 72 during periods when utility power is available, and can be used to convert output from the storage device 72 to AC output when the utility power is lost.

A charge monitoring device 106 may be connected to the storage device 72 for the purpose of measuring the charge state of the storage device 72. The charge monitoring device 106 can transmit a signal or other information to the controller of the wind turbine 20, for example, so that when the storage device 72 is fully charged, the output of the wind turbine 20 can be reduced, such as by slowing and/or stalling the rotor or by opening the circuit. The charge monitoring device 106 can communicate with a controller within the wind turbine 20 via copper wires, a fiber optic line, or via a wireless communication link, for example. One embodiment provides a wireless communication link between the charge monitoring device 106 and a controller in the wind turbine 20. The charge monitoring device 106 may also monitor the level of the load 68, such that when the storage device 72 is fully charged, the output of the wind turbine 20 is limited so as to be appropriate for the load 68. It may be necessary to provide a transformer or other voltage conversion device, such that the storage device 72 can be used at a different voltage than the utility line 70 and/or the load 68.

The wireless device can be used for other purposes, as well. For example, in one embodiment, a user can select a "quiet" mode of operation, in which RPM or power is limited, or lower tip speed ratio (TSR) is produced, so as to reduce sound emitted.

Figure 7:
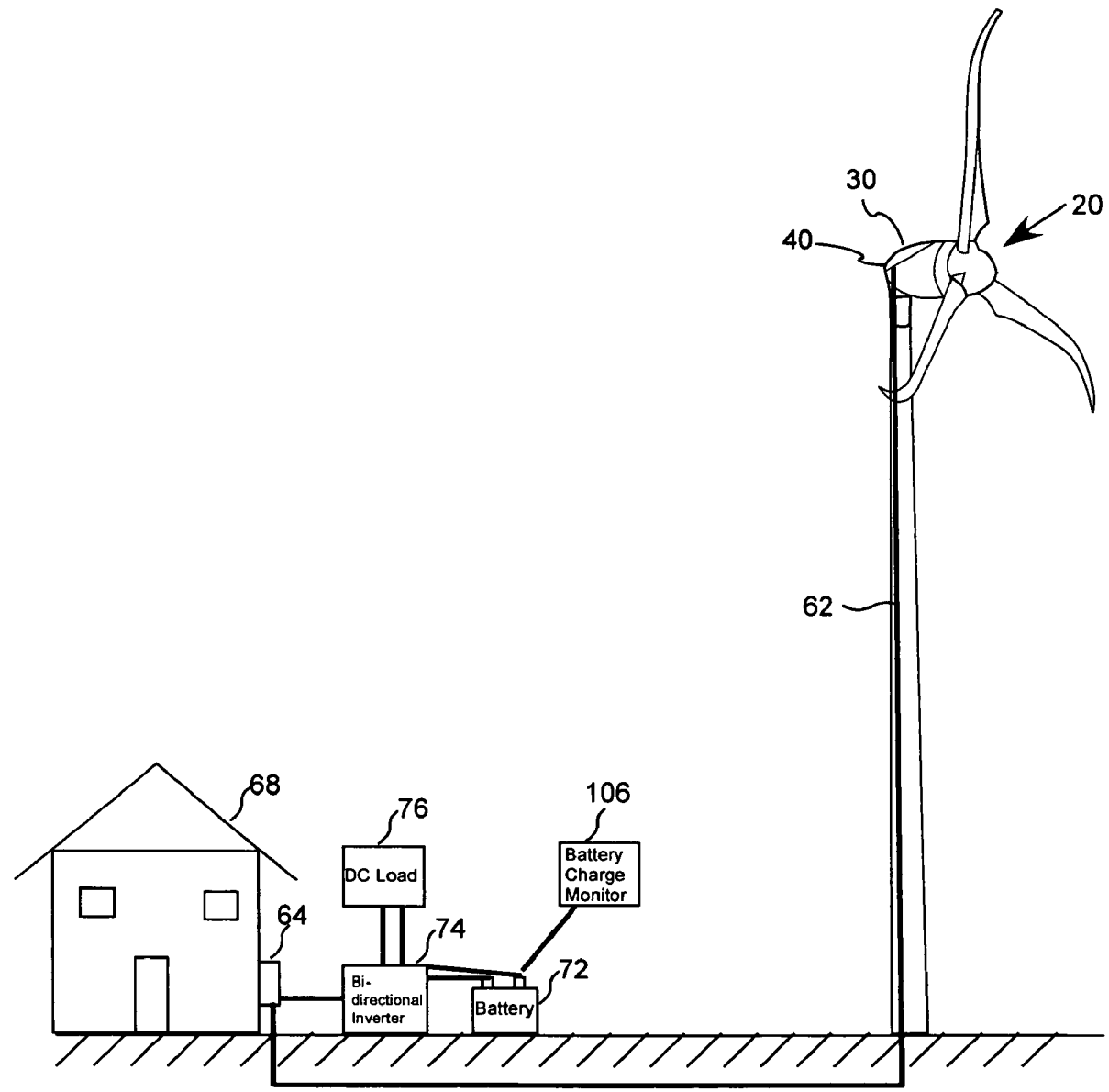
FIG. 7 shows a third configuration for connecting an exemplary wind turbine of the present invention to a load.

A third potential configuration for connecting the wind turbine according to the present invention is shown in FIG. 7. This configuration is similar to that shown in FIGS. 5 and 6 except that no utility line supplying power to the loads is shown. This is a stand-alone configuration that might be used in a remote location, for example, where utility power is not available. In this configuration, power is transmitted from the wind turbine 20 via power cables 62. The power enters a power panel 64 which could include breakers, power conditioning equipment, metering, safety equipment, or other devices that might be desired or required by local code. From the power panel 64 the power is providable to a load 68, such as may be used by a residence. In FIG. 7 the load 68 is shown as a residential load, although a wide range of loads could be powered by the wind turbine, including a radar station, a microwave transmitter, a scientific monitoring station, or any other conceivable load. A battery or other power storage device 72 is connected to the load 68 through a bi-directional inverter or other output normalizing device 74. The storage device 72 and normalizing device 74 function in a similar manner to the configuration described in FIG. 6, except that the wind turbine 20 serves the function that the electric utility line would normally serve in a conventional power backup system.

When the wind turbine 20 generates more power than the load 68 is consuming, the excess power is diverted to the storage device 72. When the wind is low and the wind turbine 20 generates less power than is consumed by the load 68, needed additional power is drawn from the storage device 72. The normalizing device 74 thus allows power to flow either to or from the storage device 72, and the output is controllable, such that inductive loads can be served.

In addition to the load 68, which may be an AC load, for example, the configuration shown in FIG. 7 includes a separate DC load 76, which could include a heater, DC light bulbs, a hydrogen electrolizer, a cathodic protection system, a pump, a heater or other DC appliance or load. A charge monitoring device 106 may be connected to the storage device 72 for the purpose of measuring the charge state of the storage device 72. The charge monitoring device 106 transmits a signal or otherwise communicates with the controller of the wind turbine 20, so that when the storage device 72 is fully charged, the output of the wind turbine can be reduced, such as by slowing and/or stopping the rotor or by opening the circuit. The charge monitoring device 106 can communicate with the controller of the wind turbine 20 over copper wires, a fiber optic line, or via a wireless communication link, for example.

One exemplary embodiment provides a wireless communication link between the charge monitoring device 106 and the controller of the wind turbine 20. The charge monitoring device 106 may also monitor the level of the DC load 76, such that when the storage device 72 is fully charged, the output of the wind turbine 20 is limited, so as to be appropriate for the DC load 76. A transformer or other voltage conversion device may be needed to allow the wind turbine 20 to be used with a storage device 72 and/or a DC load 76 of different voltages from the wind turbine 20 and the load 68.

Figure 8:
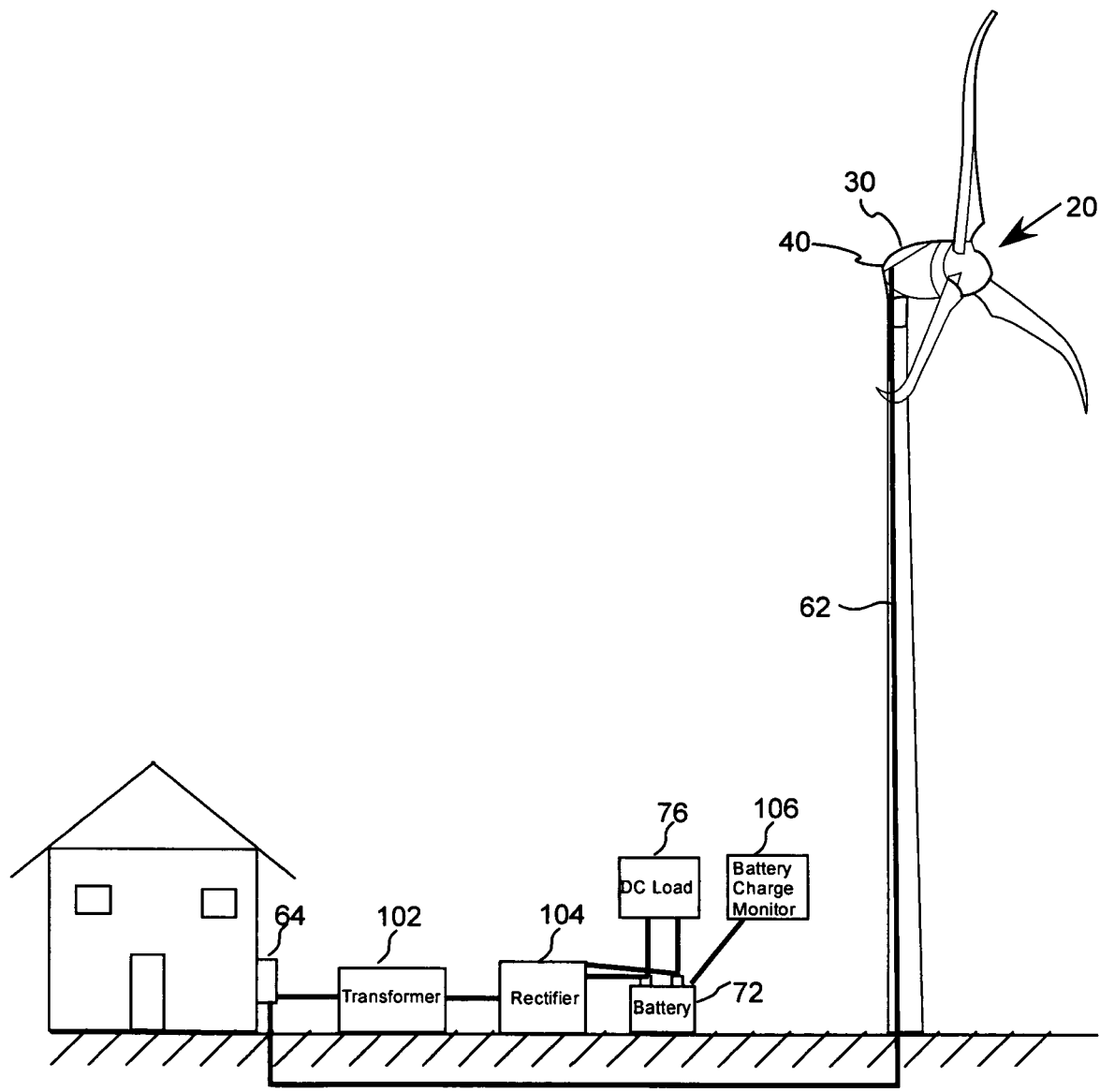
FIG. 8 shows a fourth configuration for connecting an exemplary wind turbine of the present invention to a load.

A fourth potential configuration for connecting the wind turbine according to the present invention is shown in FIG. 8. Among other things, this embodiment of the present invention allows frequency to be controlled so that the frequency is optimal for efficiency and cost. For example, the configuration of FIG. 8 involves input to a high frequency (e.g., approximately 400 Hz) transformer. In addition, with the embodiment shown in FIG. 8, because the source of the power can be controlled (e.g., by controlling operation of the wind turbine 20), no additional regulator is needed on the DC side (e.g., at DC load 76); instead, output from the AC side (e.g., within the wind turbine 20 or otherwise in the system prior to power reaching the rectifier 104) may be controlled to control DC output. The wind turbine 20 of this embodiment may further be implemented using a single phase, which allows transformers (e.g., transformer 102) used within the system to be more easily and readily obtained, thereby reducing cost (e.g., than is typical when three phase alternators are required—suitable three phase transformers are typically more difficult to obtain and use in the typical application of the turbine of this embodiment. Further, prior art turbines are known that provide variable three phase AC output (e.g., varying with turbine speed) up to a relatively high voltage (e.g., around 240 VAC). The output of such a prior art turbine is typically input to a three phase transformer, and the output of the three phase transformer is input to a rectifier. The output of the rectifier is input to a regulator, which, in turn, is connected to a load.)

In the embodiment of FIG. 8, the wind turbine 20 is connected to only a DC load 76. In prior art wind turbines, the electrical power from the wind turbine 20 to the load would be transmitted as relatively low voltage DC power. In this application of the present invention, the power is transmitted from the wind turbine 20 to the load as relatively high voltage AC power on cable 62. The AC voltage can be selected as a matter of design choice, but should preferably be as high as practical to reduce the size of cable 62 and to minimize line losses. A voltage of 120 VAC or 240 VAC can be expected to work well in many applications.

In this variation of the present invention, an AC to DC converter 104, such as a rectifier, is provided near the DC load 76, for example, and/or an energy storage device 72, such as a battery. Also, since the power is transmitted as high voltage AC power, a transformer or other voltage conversion device 102 may be used to convert the voltage to a level that is appropriate for the storage device 72 and/or the DC load 76. Typically, the DC load 76 might operate at a voltage of 12, 24, 36, or 48 Volts, although other voltages are possible, as a matter of design choice. A charge monitoring device 106 may be connected to the storage device 72 for the purpose of measuring the charge state of the storage device 72. The charge monitoring device 106 should communicate with the controller of the wind turbine 20, so that when the storage device 72 is fully charged, the output of the wind turbine 20 can be reduced or stopped.

The charge monitoring device 106 can communicate with the wind turbine 20 over copper wires, a fiber optic line, or via a wireless communication link, for example. One embodiment provides a wireless communication link between the charge monitoring device 106 and the wind turbine 20.

Figure 9:
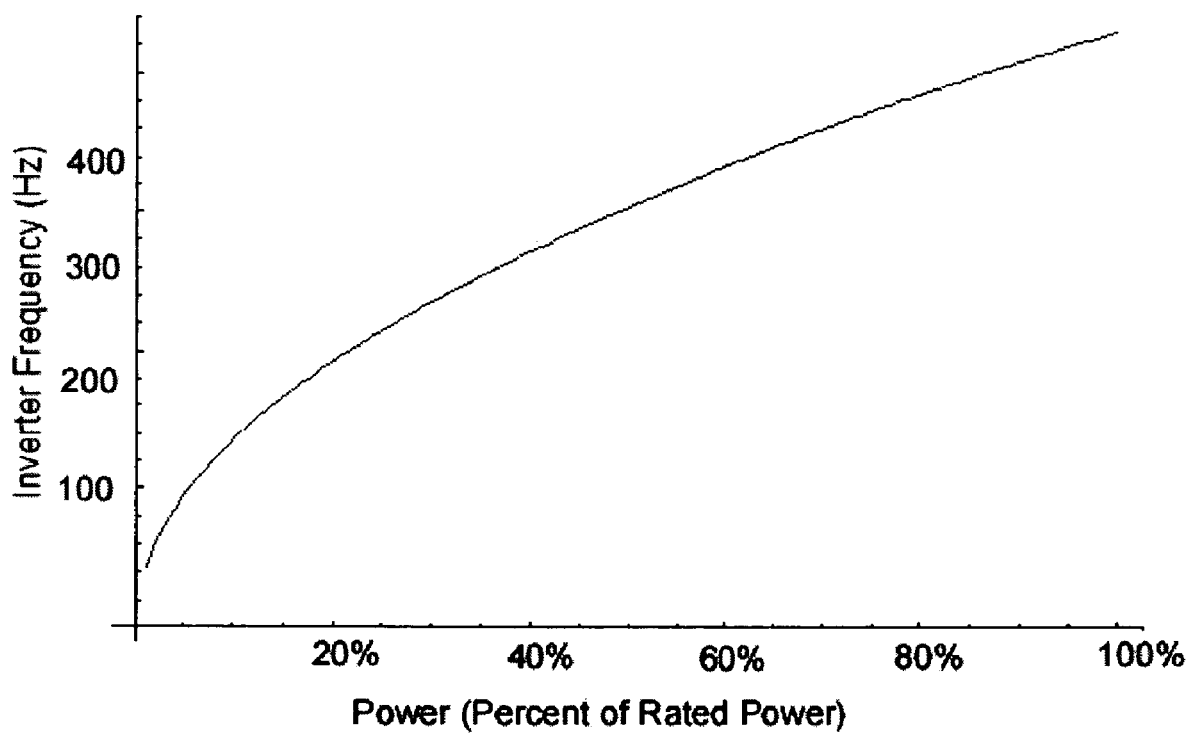
FIG. 9 shows a graph indicating how AC output frequency from an exemplary inverter may be varied with output power level for driving a transformer or other device, in accordance with an embodiment of the present invention.

In the embodiment shown in FIG. 8, the electrical losses associated with the conductor 62 from the wind turbine 20 to the DC load 76 is minimized. However, there are additional losses that result if the voltage conversion device 102 is a transformer. At low power levels, core losses dominate for the transformer, whereas current related losses for the transformer dominate at high power levels. The overall transformer losses can be minimized by utilizing a DC to AC converter, such as an inverter, so as to produce output of the wind turbine at variable frequency, depending on the power level, as shown in FIG. 9. FIG. 9 shows a graph of inverter frequency versus wind turbine power output, in which, at low power levels, when core losses from the transformer dominate, the frequency of the output device can be set lower, so as to offset these losses. At high power levels, the frequency of the output device can be increased, thereby minimizing transformer current related losses.

The relationship between frequency and power may be different than that shown in FIG. 9, depending on the size of the wind turbine, the design of the transformer, the length and size of cable between the wind turbine and the transformer, and other factors. The size and cost of the transformer can be reduced by the ratio of the minimum inverter frequency divided by the maximum inverter frequency. Therefore, if the minimum frequency is, for example, 50 Hz and the maximum frequency is, for example, 500 Hz then the transformer can be sized at just 10% of the size that would be required if the inverter operated at constant frequency.

Figure 10A:
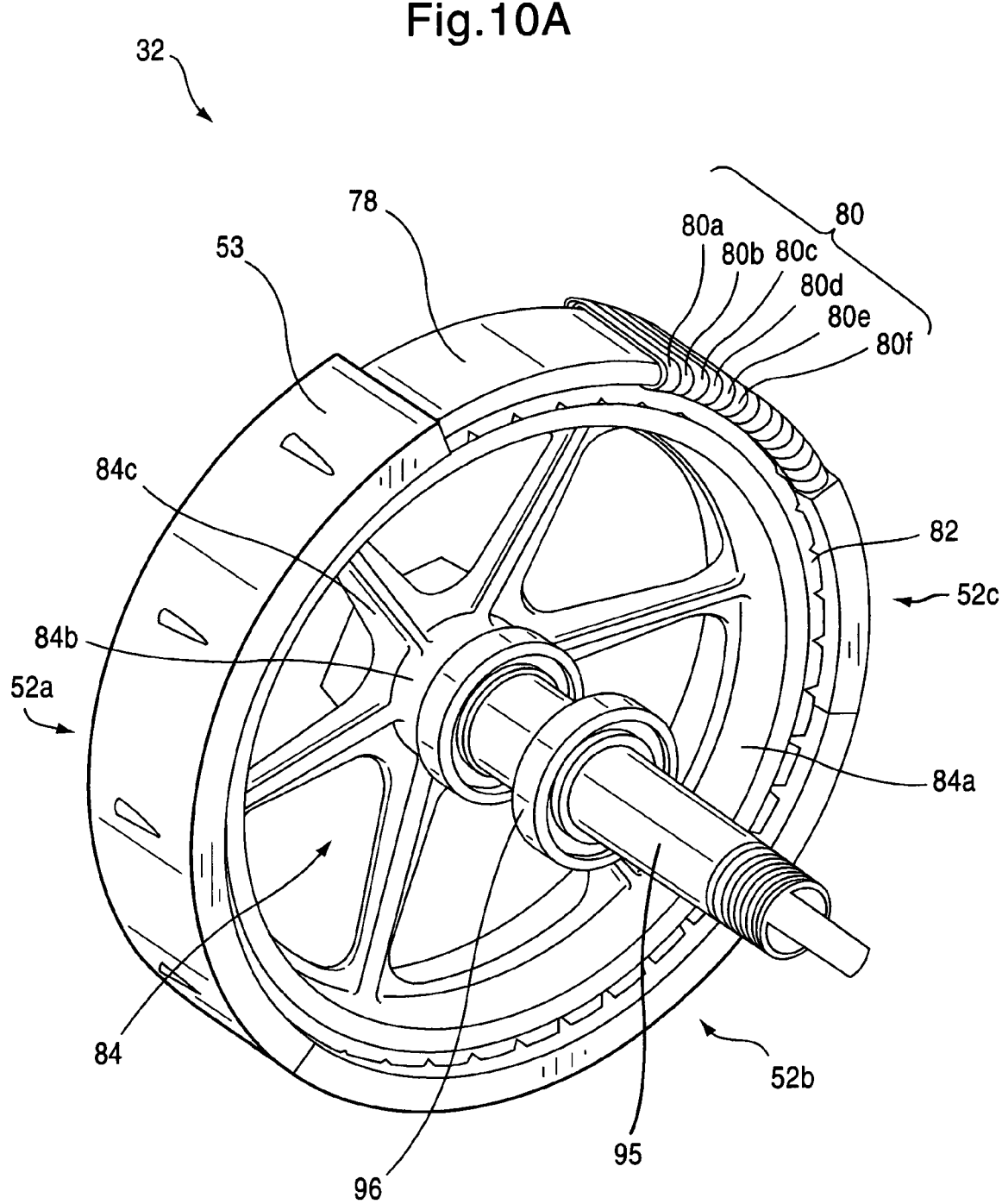
FIGS. 10A-10C show partial views of an exemplary slotless alternator design in accordance with an embodiment of the present invention.
Figure 10B:
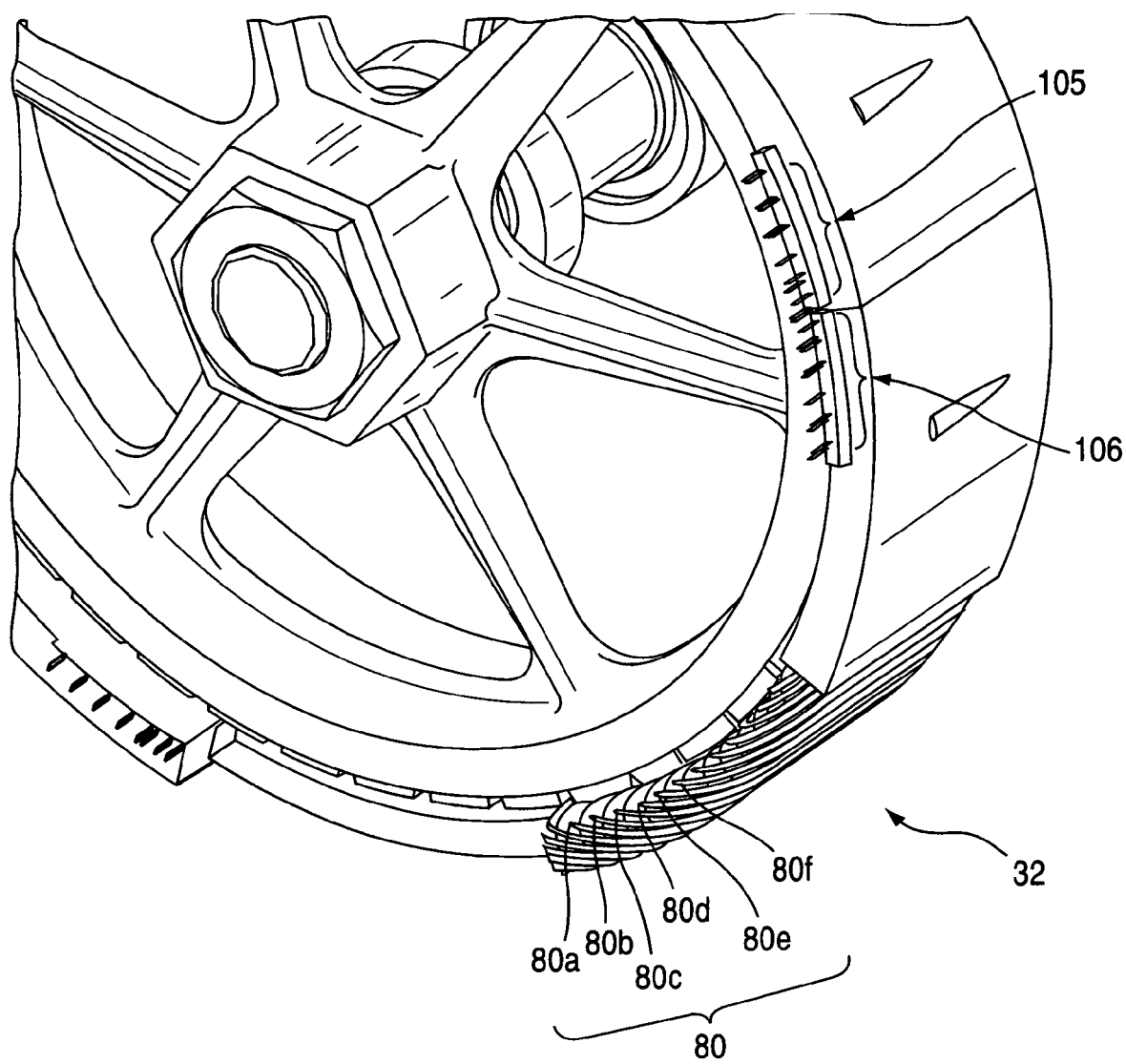
Figure 10C:
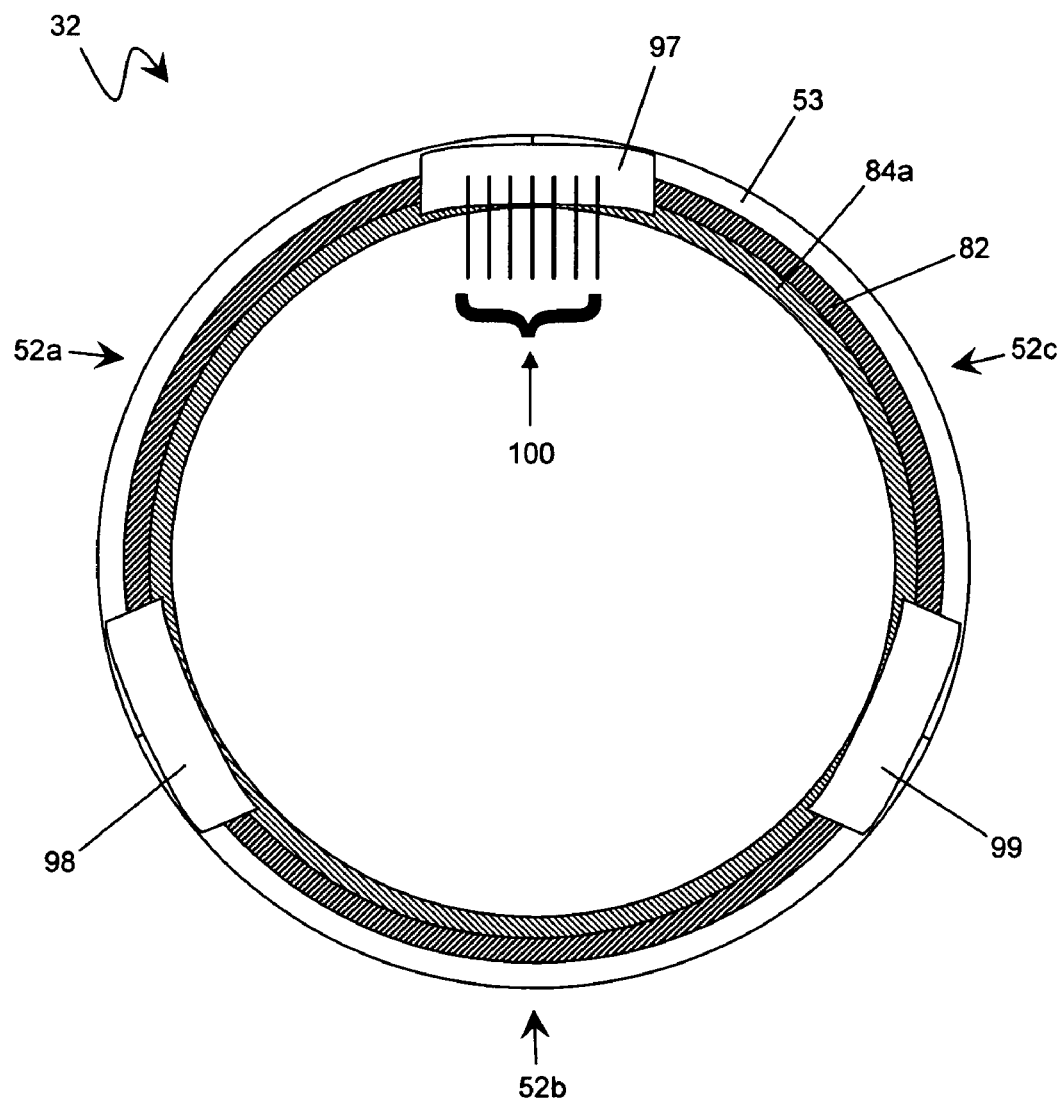

FIGS. 10A-10C show partial views of an exemplary slotless alternator design 32 in accordance with an embodiment of the present invention. The cutaway views of the alternator shown in FIGS. 10A and 10B include conductor coils 80 formed from a flat conductor material (e.g., copper) emplaced around a laminated or other eddy current reducing material, such as powdered iron, providing a low loss core 78, the core comprising a magnetic flux conducting material, such as steel or other ferrous material. The use of a flat conductor material, for example, maximizes the compactness in spacing of the coils 80, while minimizing eddy currents and other negative effects associated with use of round cross-sectional conductor material, such as typical round profile copper wire.

The laminated or otherwise low loss core 78 and emplaced conductor coils 80 are surrounded by a molded section 53, such as plastic casing. The winding portion of the alternator 32, which includes the laminated or otherwise low loss core 78, the coils 80, and the molded section 53, is generally fixedly located in a housing of a turbine. In the embodiment shown in FIGS. 10A-10C, the winding portion of the alternator 32 is divided into three sections 52a, 52b, 52c, although any suitable number of sections (including one) may be used. Advantages of the use of such sections 52a, 52b, 52c include increased ease of repair by allowing disassembly and replacement of only a portion of the winding portion of the alternator 32. In addition, emplacement of the coils 80 about the laminated or otherwise low loss core 78 is simplified, as the coils 80 may be wound separately from the core portions corresponding to the winding portion sections 52a, 52b, 52c, and then slidably or otherwise emplaced about the winding portion sections 52a, 52b, 52c via the ends of the winding portions sections 52a, 52b, 52c. Further, the sections 52a, 52b, 52c may be more easily produced by comprising smaller angle portions of the overall winding portion of the alternator 32. For example, in one embodiment, the laminations and/or other core material are stamped from flat stock, and a greater number of laminations may be most efficiently produced from the flat stock by using one third sections (or smaller) sections of the winding portion of the alternator 32. Likewise, such produced core sections and produced winding portions may more easily by shipped and stored.

As shown in the exemplary alternator 32 of FIG. 10A, a rotating portion of the alternator 32 includes a rotor portion 84 and a magnet portion 82. The rotor portion 84 includes a rim portion 84a, a hub portion 84b, and one or more spokes or other connectors 84c for coupling the rim portion 84a to the hub portion 84b. The magnet portion 82 includes a plurality of magnetic elements (e.g., individual magnets or magnetized portions of magnetic material) arranged about and attached to the rim portion 84a. For example, the magnetic elements may include a plurality of individual magnets abuttably attached (e.g., such as by an adhesive) to the rim portion 84a, each of the individual magnets being oriented 180° in its polar direction relative to each pair of adjacent individual magnets, such that alternating pairs of adjacent north and south magnet poles are formed, and fields are produced by such magnets, each field having an orientation 180° opposite the field produced by each adjacent magnet. To increase the magnetic flux transmitted via the magnetic elements, such as relative to air, the core 78 is typically includes a magnetic flux conducting material, such as iron, steel, or other ferrous material, and the rim portion 84a of the rotor portion 84 also includes a magnetic flux conducting material, such as iron, steel, or other ferrous material.

As best shown in FIG. 10A, the hub 84b of the rotor portion 84 for the exemplary alternator 32 of FIGS. 10A-10B, is attached to an axle 95. The axle 95 may include one or more features 96, such as bearings or bushings, for minimally frictionally engaging a mounting, such as an opening in an alternator housing. In operation, the magnet portion 82 is thus able to rotatably move via the rotor portion 84 and the driven axle 95 (e.g., driven via a wind operated device, such as a wind generator blade) relative to the fixably maintained winding portion.

The coils 80 of the exemplary embodiment shown in FIGS. 10A and 10B are connected so as to form six sets of windings 81a, 81b, 81c, 81d, 81e, 81f, which abut one another and repeat in sequence about the circumference of the laminated or otherwise low loss core 78. As shown most clearly in FIG. 10B, each of the sets of windings 81a, 81b, 81c, 81d, 81e, 81f is connected to the next corresponding set of windings along the windings portion of the alternator 32 at one end. In one embodiment, successive pairs of each of the sets of windings are connected at opposite ends, such that the each successive coil portion has opposite polarity to the previous connected coil portion. Among other advantages, this approach allows multiple connections and increased redundancy to be obtained, thereby providing the necessary redundancy for the redundant stall control. Assembly may be eased and performance may be improved by ensuring that each of the sets of windings 81*a*, 81*b*, 81*c*, 81*d*, 81*e*, 81*f* are very similar or essentially identical.

FIG. 10C shows a partial diagram of the alternator 32, which includes the windings portion 53, the magnet section 82, and the rim 84*a* of the hub. Upon assembly, each of the three winding portion sections 52*a*, 52*b*, 52*c* of the alternator 32 is connected at its ends to the adjacent two sections. Six wire ends (see, e.g., wiring end groups 105, 106, as shown in FIG. 10B), one for each of the six sets of windings 80*a*, 80*b*, 80*c*, 80*d*, 80*e*, 80*f*, as shown in FIGS. 10A and 10B, extend from each end of each of the three winding portion sections 53*a*, 53*b*, and 53*c*. Each of the six wire ends extending from each abutting pair of winding portion sections 53*a*, 53*b*, 53*c* is coupled to the six wire ends extending from the adjacent winding portion section. The coupling may occur, for example, via printed circuit boards or other coupling components 97, 98, 99. Each of the laminated or otherwise low loss cores 78 of each of the winding portion sections 52*a*, 52*b*, 52*c* similarly abut one another.

Six continuous windings are therefore formed by the coupled corresponding windings in each of the winding portion sections 53*a*, 53*b*, 53*c*, shown in FIGS. 10A-10C, with a first end of each of the six continuous windings terminating at one of the coupling components 97, which includes a lead corresponding to each of the first ends of the six continuous windings. Each of the second ends of the six continuous windings are coupled together via the coupling component 97 and coupled to a seventh lead, such that seven leads 100 extend from the coupling component 97, the seventh lead corresponding to the center point of the six continuous windings. Various circuit diagrams for windings are shown in Applicant's copending U.S. Provisional Patent Application No. 60/760,407, titled "STALL CONTROLLER AND BACKUP FOR A WIND TURBINE," filed Jan. 20, 2006, and the corresponding U.S. patent application thereof, titled "STALL CONTROLLER AND BACKUP FOR A WIND TURBINE," filed even herewith.

Figure 11:
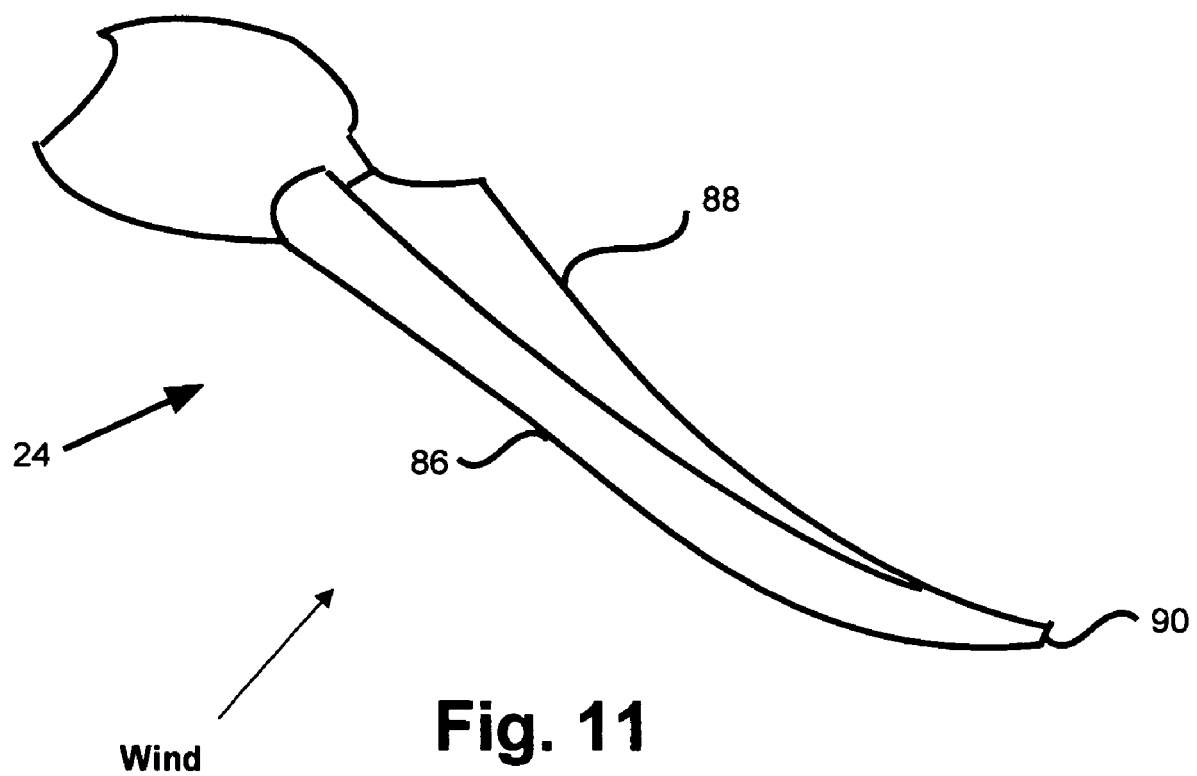
FIG. 11 is a perspective view of an exemplary blade design usable with embodiments of the present invention.
Figure 12:
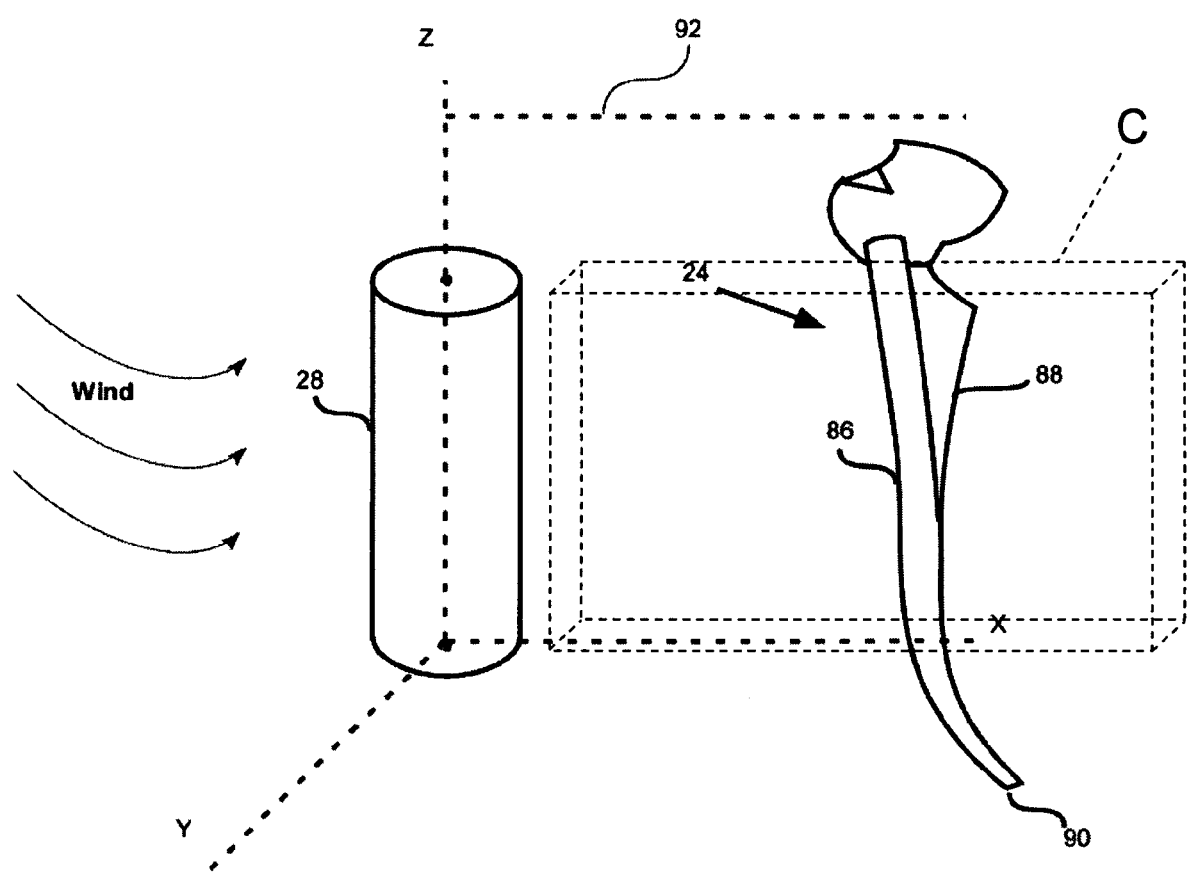
FIGS. 12 and 13A-13C show views of the blade within and traveling through the cross-sectional area of the tower, in accordance with an embodiment of the present invention.

FIGS. 11 and 12 show various features of a blade 24 of the present invention. The blade 24 in the variation of the present invention shown in FIGS. 11 and 12 may be formed of glass reinforced polyester in a multi-part injection mold or in a multi-part compression molding process, for example. The present invention allows for each blade 24 to be manufactured from other materials, so long as the blades are lightweight, economical, and durable. One advantage of using a multi-part injection mold to form the blade 24 is that the blade 24 can be mass-produced in a simple and inexpensive manner. Another advantage is that, by separating the blade 24 into a section facing a low pressure side of the blade 24 when in operation and a section facing a high pressure side of the blade 24 when in operation, as described in greater detail below with reference to FIGS. 14A and 14B, the blade 24 can be made lighter in weight and internal strengthening features, such as ribbing, added. This manufacturing approach allows lower costs, lighter weight and greater bonding areas between the sections forming the blade to be obtained.

Figure 13A:
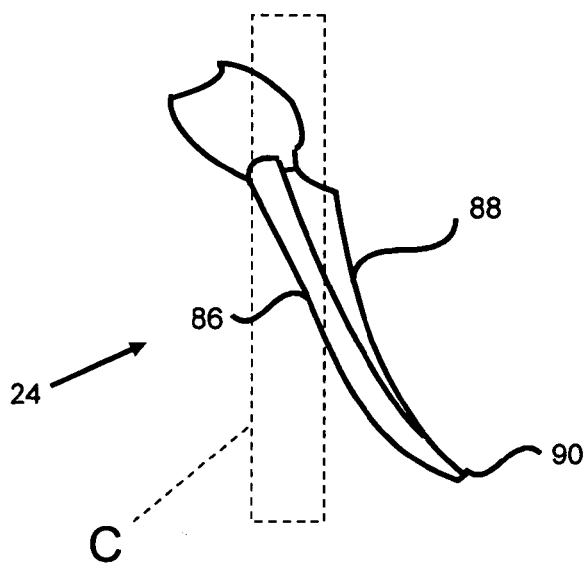
Figure 13B:
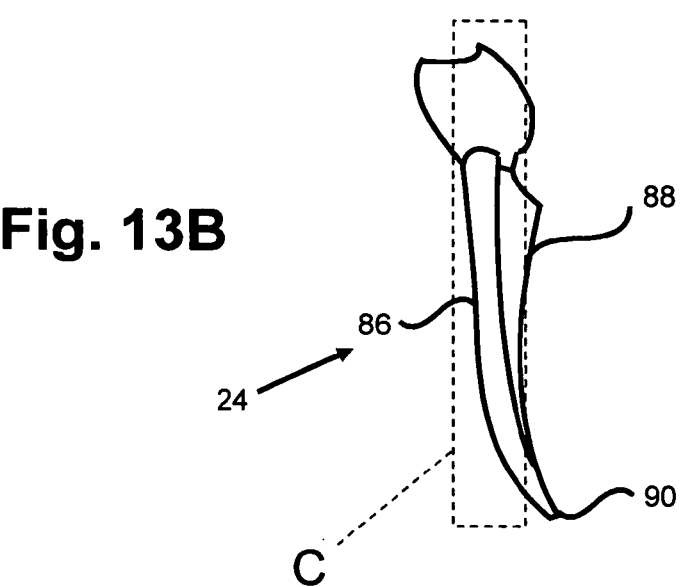
Figure 13C:
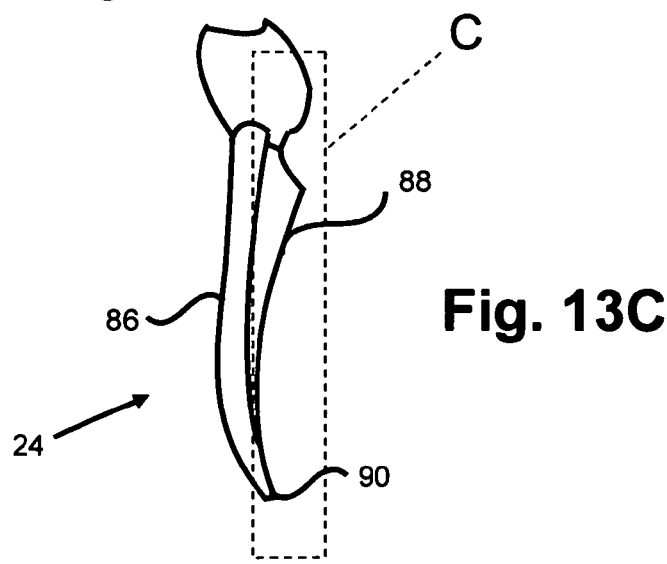

As shown in FIGS. 13A-13C, as the wind rotates each blade 24, the blade 24 enters an area C downwind of the tower 92. Due to a wake created by the tower, the wind speed in the cross-sectional space C downwind of the tower is decreased. The blades 24 of embodiments of the present invention are constructed with a swept configuration, such that a root portion of the blade 24 enters the cross-sectional space C downwind of the tower first (see FIG. 13A) and then the rest of the blade 24 follows the root end gradually (see FIG. 13B). The tip 90 of the blade 24 enters the cross section C of the tower 92 after the rest of the blade 24 has entered (see FIG. 15C). As each blade 24 turns, the root end of the blade 24 exits the tower shadow before the tip 90 of the blade 24 enters the area C.

As prior art blades entered and exited the tower shadow in the plane that is downwind of the tower without such sequential entrance and exit of portions of each blade, the relatively abrupt change in wind speed created an impulsive change in the blade's angle of attack, which resulted in a periodic noise being generated by the blades passage through the tower shadow. By providing a swept blade profile, among other things, the present invention solves or mitigates the issue of periodic noises that are emitted by wind turbine blades of the prior art.

Figure 14A:
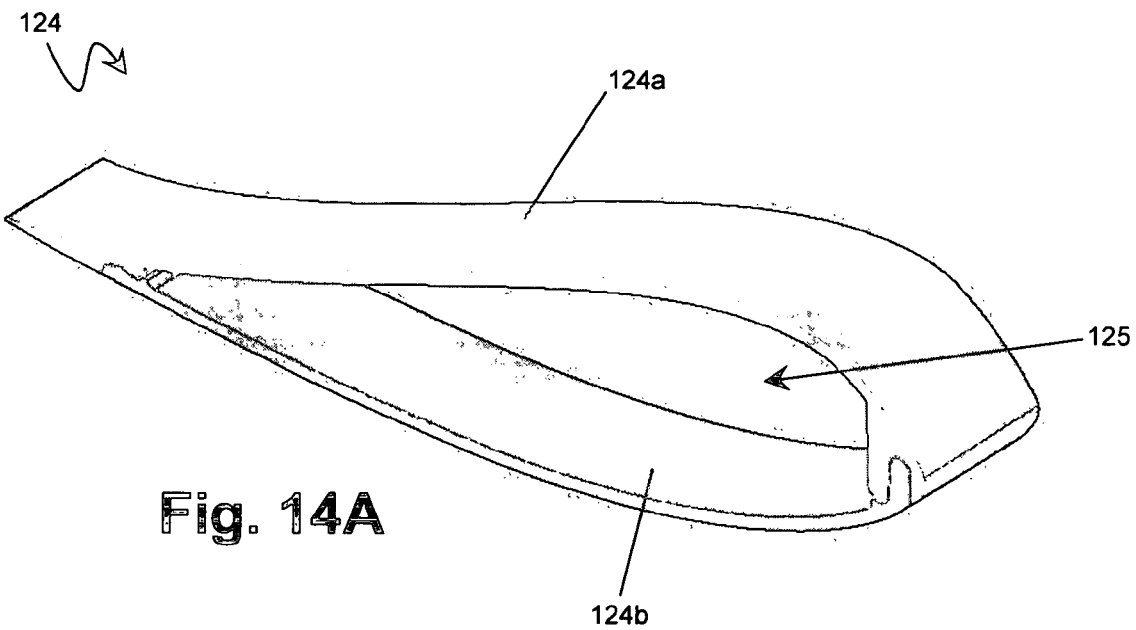
FIGS. 14A and 14B show features relating to manufacture of an exemplary blade in accordance with an embodiment of the present invention.
Figure 14B:
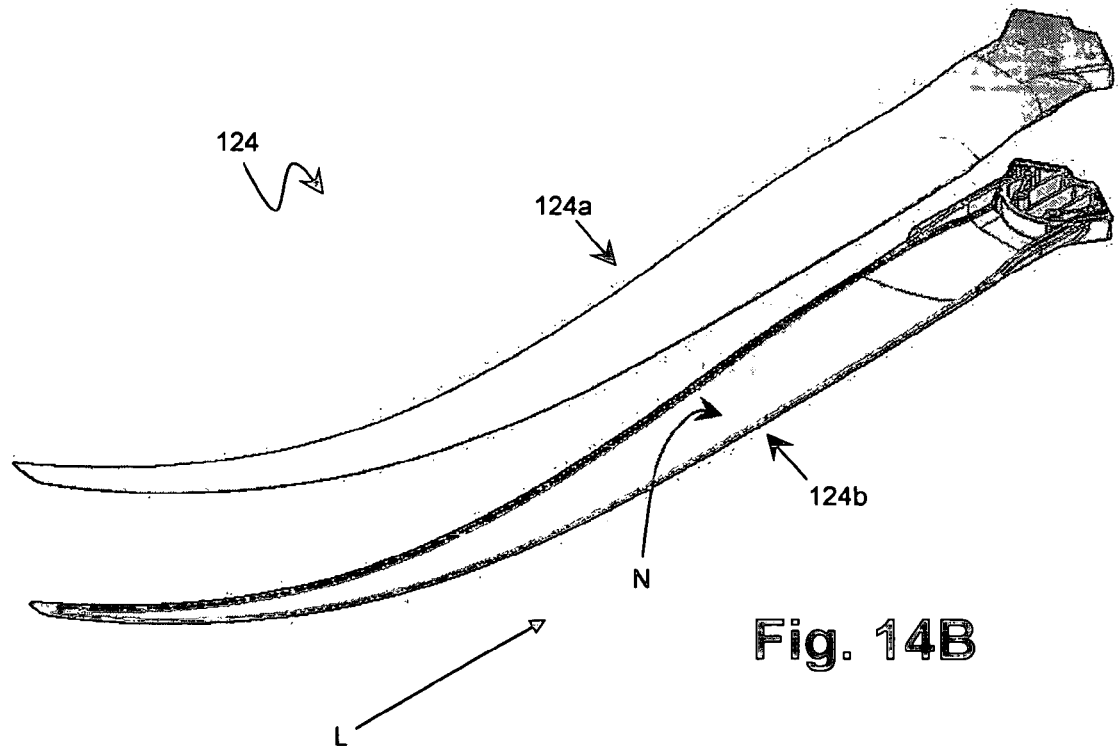

FIGS. 14A and 14B show features relating to manufacture of an exemplary blade 124 in accordance with an embodiment of the present invention. FIG. 14A shows a cross-sectional view across the width of an exemplary blade 124. As shown in FIG. 14A, the blade 124 is divided into two sections 124*a*, 124*b*, which are shown in an assembled position in FIG. 14A. (Blades may similarly be made of more than two sections.) A first blade section 124*a* is generally oriented on the high pressure side of the blade 124 when in operation, and a second blade section 124*b* is generally oriented on the low pressure side of the blade 124 when in operation. As further shown in FIG. 14A, a chamber portion 125 of the blade 124 is formed between the assembled first blade section 24*a* and the second blade section 124*b*.

FIG. 14B shows the blade of 124 shown in an unassembled perspective view. As shown in FIG. 14B, the blade 124 of this embodiment is divided into the first blade section 124*a* and the second blade section 124*b* generally in the length-wise direction L of the blade 124. Sectioning the blade 124 in the direction L as shown in FIGS. 14A and 14B is superior, for example, to prior art methods of forming a blade that involves dividing the blade perpendicularly to the direction L, as shown in FIGS. 14A and 14B, in that the prior art approach tends to produce a weakness in the blade at the dividing point or result in other performance problems.

Among other things, by assembling a blade 124 in the manner shown in FIGS. 14A and 14B, the formed blade 124 is lighter, by virtue of the hollow (chamber) portion formed 125, than, for example, a solidly formed single piece blade of the same material. Weight and rigidity of the formed blade 124 may also be controlled via control of wall thickness for each of the first and second blade sections 124*a*, 124*b*. Further, production of the blade 124 is eased by use of a multiple blade section and hollow portion approach along the lines shown in FIGS. 14A and 14B, as uniformity in material may be more easily be obtained and the parts formed more easily (e.g., via injection molding) than, for example, a production method that forms a solid blade from injection molding.

In some embodiments, ribbing may be added within the hollow (concave) portion 125, so as to enhance the rigidity and strength of the formed blade 124 and to increase the area for potentially bonding the blade sections 124*a*, 124*b* to one another. Exemplary such ribbing 124*c* is shown in one end of the second blade section 124*b* of FIG. 14B. In one embodiment, further ribbing is added within the interior area N of the second blade section 124*b* (and corresponding portion of the first blade section 124*a*), with the general length-wise orientation of each such rib in the ribbing being in a direction parallel to the length direction L of the blade 124. This orientation of the ribs generally adds rigidity to the blade 124 in the length-wise direction L, the direction of generally greatest stress on the blade 124 during operation.

Figure 15A:
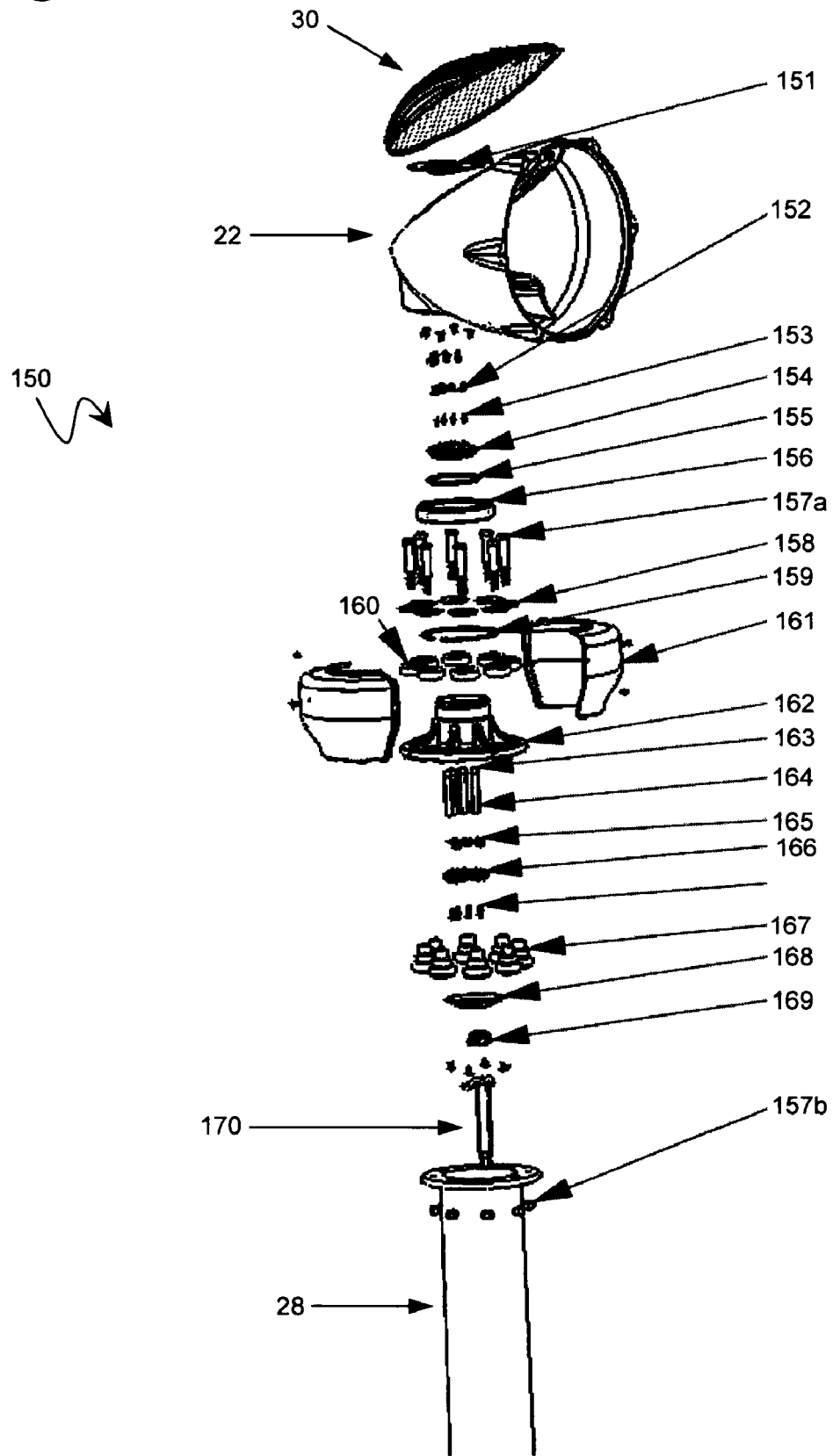
FIGS. 15A-15F contain representative figures of an exemplary yaw assembly for use with a wind turbine, in accordance with an embodiment of the present invention

FIGS. 15A-15F present an exemplary yaw assembly 150, in accordance with an embodiment of the present invention. FIG. 15A contains an exploded view of components of the exemplary yaw assembly 150. These components include slip ring features 151 attachable to or incorporable in a PCB or other circuit device, which may include other electrical components and circuits components, such as a line filter or surge arrestor; one or more brushes or other variably coupleble mechanisms having spacers therebetween, and holding features 152, 154 for coupling the slip ring features 151 to an output line or lines 170; one or more biasing mechanisms 153, such as springs, for biasing the variably coupleable mechanisms 152 to contact the slip ring features 151; one or more slideable engagement features 155, 156, 159 such as snap rings and bearings, for allowing slidable rotation of the turbine housing 22 relative to a yaw 162, the yaw 162 being attached to the tower 28 via one or more flexibly operating attachment features 157a, 157b, 158, 160, 167, such as bolts and nuts, washers, and flexible bushings, such as rubber bushings; a yaw shield 161, to physically or otherwise protect various features of the yaw assembly 150, such as from ultra-violet radiation; one or more rigid coupling devices 163, such as brass connecting tubes, having optional insulation sleeves 164, the one or more rigid coupling devices 163 being engageable with coupling device engagement features 165, such as lugs for coupling the output line or lines 170 to the rigid coupling device or devices 163; an insulator 166 and cover 168 for allowing access to features of the yaw assembly 150; and a strain relief device 169 for strain relievingly allowing attachment of the output line or lines to the yaw assembly 170.

Figure 15B:
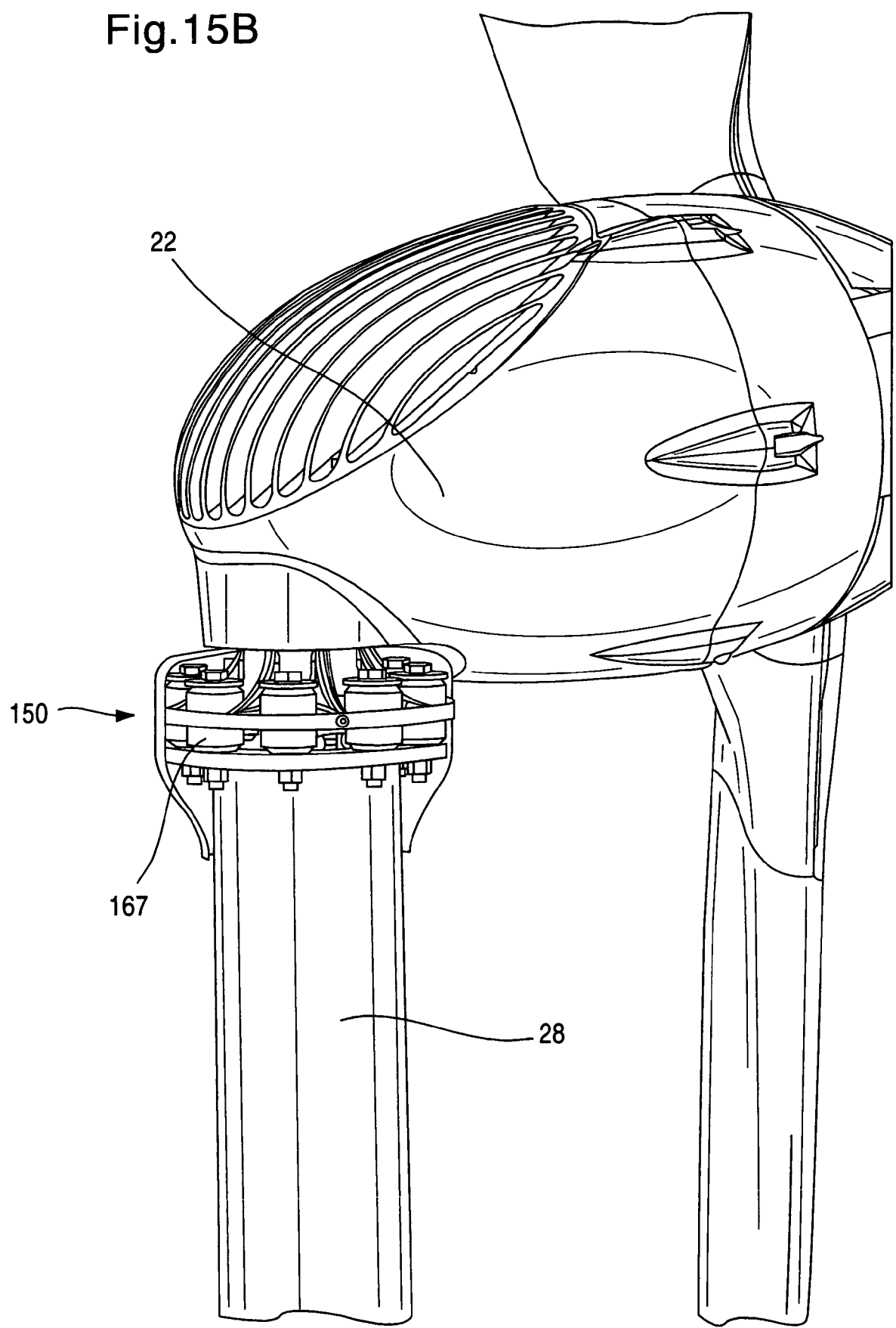

FIG. 15B presents a partial cutaway view of certain features of the exemplary yaw assembly 150 of FIG. 15A. As shown in FIG. 15B, the turbine housing 22 is attached to the tower 28 via the yaw assembly 150, which includes, for example, bearings or other flexibly operating attachment features, such as feature 67, for reducing vibration/shock.

Figure 15C:
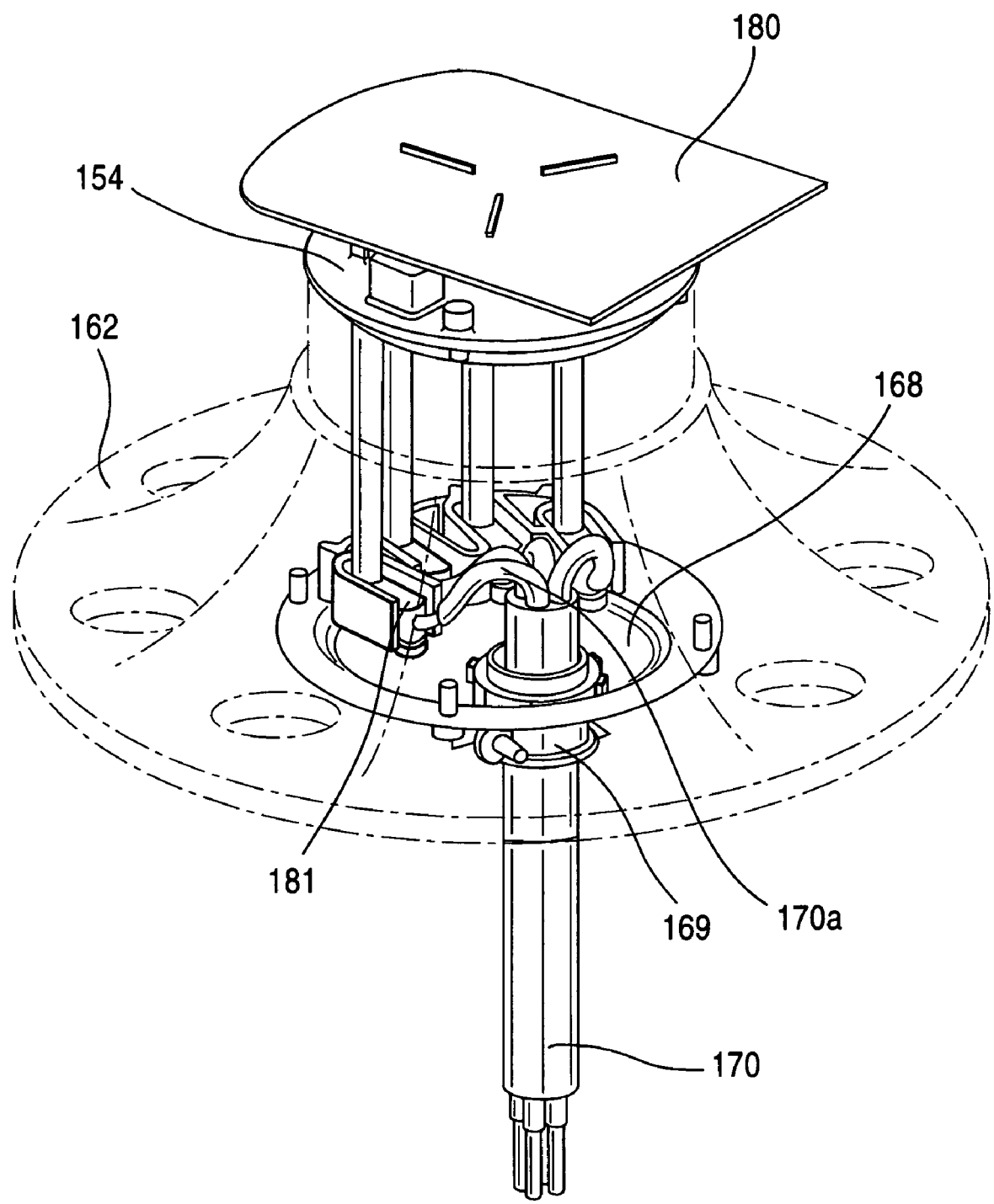

FIG. 15C shows a partial view of various components of the yaw assembly 150 of FIG. 15A, and other features interactable therewith. As shown in FIG. 15C, a controller and/or other circuitry device 180, such as a PCB containing an AC line filter, surge arrestor, and/or other components, has slip ring features attached to the lower side thereof, as shown in FIG. 15C. Engaging the slip ring features are one or more brushes or other variably coupleable mechanisms contained within holding features 154. The holding features 154 (e.g., brush holder) are attached to the yaw 162. Also shown in FIG. 15C are coupling attachment features 181, such as lugs, for coupling output wires or other variably coupleable mechanisms to individual lines 170a of the output lines 170; the cover 168; and the strain relieve device 169.

Figure 15D:
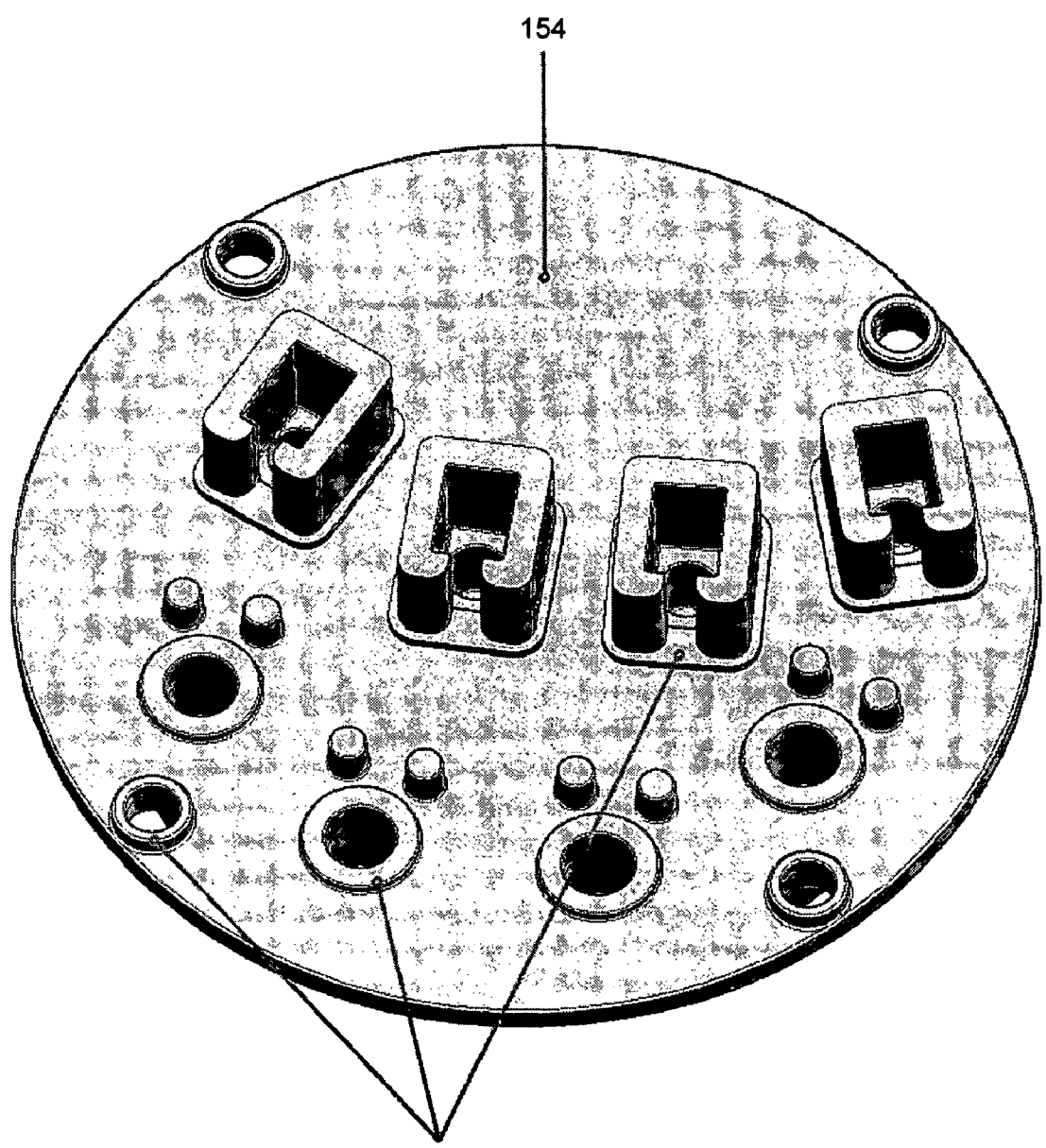

FIG. 15D presents a perspective view of the holding features 154.

Figure 15E:
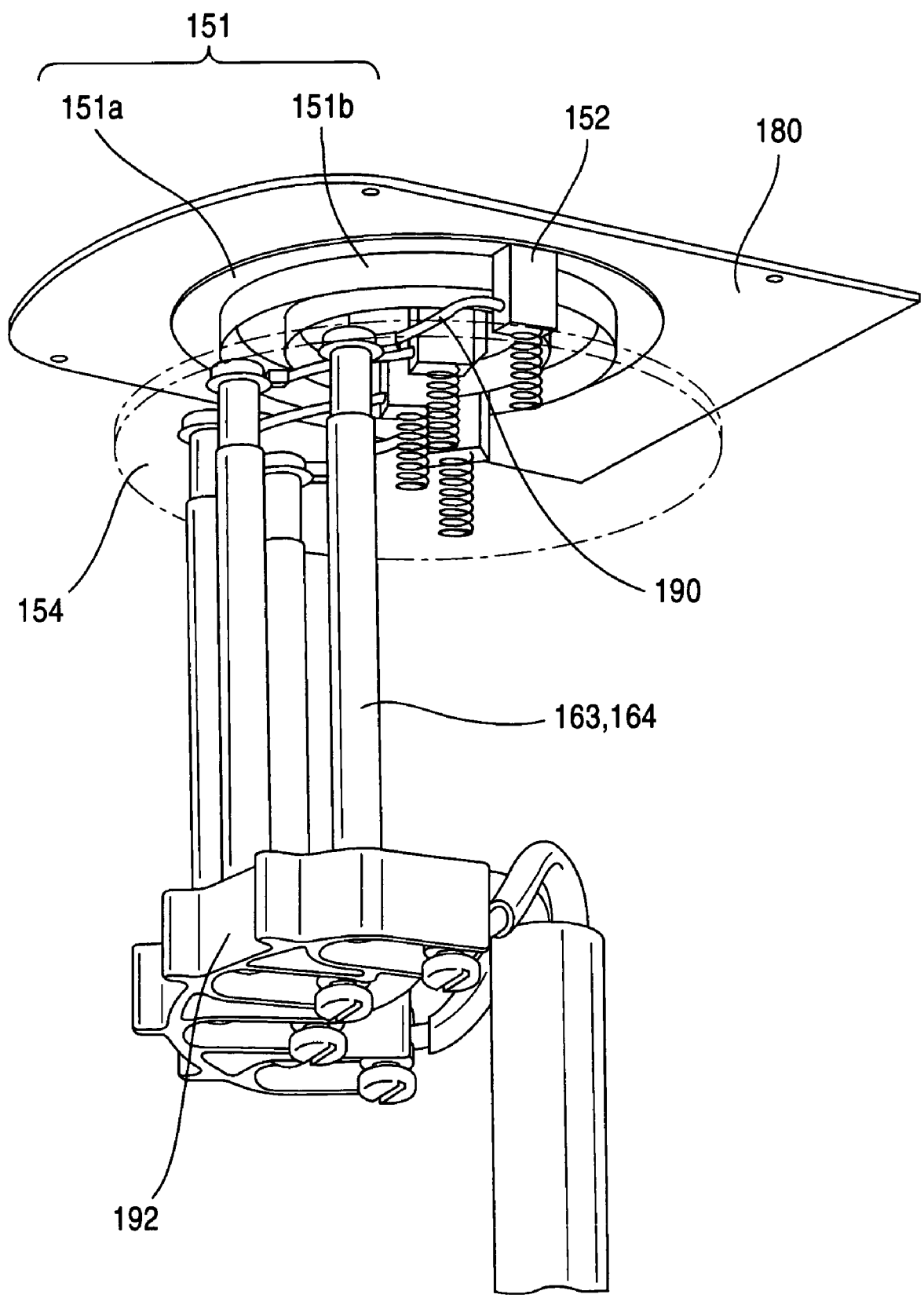

FIG. 15E is another partial view of various components of the yaw assembly 150 of FIG. 15A and features interactable therewith. Features shown in the view of the yaw assembly 150 of FIG. 15E include the circuitry device (e.g., PCB) 180, various exemplary slip ring features 151, including one or more wafer slip rings 151a and one or more spacers 151b, such as insulators between the slip rings 151a; one or more variably coupleable mechanisms 152, such as brushes, having couplings 190, such as leads; one or more biasing mechanism 153, such as springs; holding features 154; rigid coupling devices and emplaced insulating sleeves 163, 164; and an attachment feature holder 192 for holding and separating attachment features, such as attachment features 181 shown in FIG. 14C.

Figure 15F:
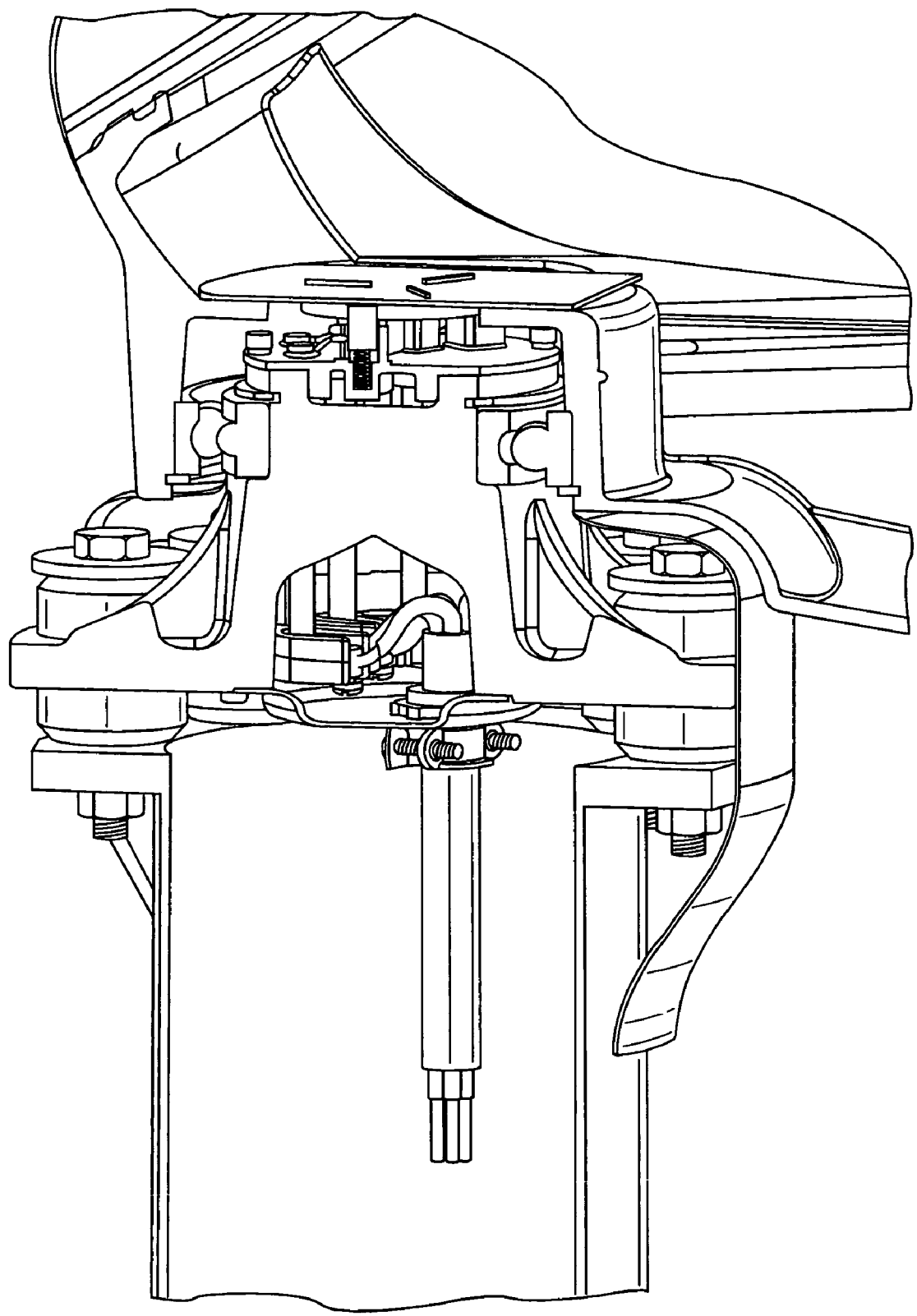

FIG. 15F contains another cutaway view of the various components of the yaw assembly 150 of FIG. 15a and features interactable therewith in assembled position.

Example embodiments of the present invention have now been described in accordance with the above advantages. It will be appreciated that these examples are merely illustrative of the invention. Many variations and modifications will be apparent to those skilled in the art.

What is claimed is:

1. A wind turbine, comprising:
   an electrical output device including a plurality of winding portions;
   at least one wind driven blade operatively coupled to the electrical output device, wherein movement of the at least one wind driven blade produces output from the coupled electrical output device;
   an inverter coupled to the electrical output device;
   a bi-directional inverter coupled to the inverter;
   a storage device coupled to the bi-directional inverter;
   a controller coupled to the inverter and configured to control the output of the electrical output device via stall regulation; and
   a shutdown switch coupled to each of the plurality of winding portions, the shutdown switch being capable of increasing current based torque opposing operation of the wind turbine;
   wherein the stall regulation is controlled via shorting of at least one of the plurality of winding portions.

2. The wind turbine of claim 1, wherein the electrical output device is an alternator.

3. The wind turbine of claim 1, wherein the bi-directional inverter is coupled to the storage device and a DC load, wherein the DC load is selected from a group consisting of a battery, a pump, a compressor, a heater, a cathodic protection device, a DC to DC converter, and an electrolizer.

4. The wind turbine of claim 3, wherein the electrical output device is usable over a range of power requirements of the DC load.

5. The wind turbine of claim 3, wherein the bi-directional inverter is further coupled to an AC load.

6. The wind turbine of claim 5, wherein the AC load is selected from a group consisting of a pump, a compressor, a heater, and a transformer.

7. The wind turbine of claim 5, further comprising:
   a first sensor for sensing the DC load; and
   a second sensor for sensing the AC load;
   wherein the controller controls operation of the wind turbine as a function of input received by the first and second sensors.

8. The wind turbine of claim 3, wherein the bi-directional inverter is further coupled to an AC load, wherein the DC load and the AC load are each variable, and wherein the controller controls output of the electrical output device as a function of the variable DC load and the variable AC load.

9. The wind turbine of claim 3, wherein the controller is coupled to a second wind turbine.

10. The wind turbine of claim 9, wherein the DC load is variable, wherein the second wind turbine has a variable second wind turbine load, the variable second wind turbine load being selected from at least one of a variable second wind turbine AC load and a variable second wind turbine DC load, and wherein the controller controls output of the wind turbine and the second wind turbine as a function of the variable DC load and as a function of the variable second wind turbine load.

11. The wind turbine of claim 1, further comprising: a sensor coupled to the storage device, wherein the controller controls operation of the wind turbine as a function of input received by the sensor.

12. The wind turbine of claim 11, wherein the controller is wirelessly coupled to the sensor.

13. The wind turbine of claim 11, wherein the sensor is contained within a housing.

14. The wind turbine of claim 1, wherein the electrical output device has an output in a range of between about 0 volts and 420 volts.

15. The wind turbine of claim 1, wherein the controller is wirelessly coupled to the bi-directional inverter.

16. The wind turbine of claim 1, wherein the controller is wirelessly coupled to the inverter.

17. The wind turbine of claim 1, further comprising: a housing, wherein the inverter is contained within the housing.

18. The wind turbine of claim 17, wherein the electrical output device is contained within the housing.

19. The wind turbine of claim 18, wherein the housing is a nacelle.

20. The wind turbine of claim 17, wherein the controller is contained within the housing.

21. The wind turbine of claim 1, wherein the wind turbine is stall regulated under a predetermined condition, and wherein the predetermined condition is selected from a group consisting of a predetermined blade movement speed, a power output limit, and a startup condition.

22. The wind turbine of claim 1, wherein the shorting of the at least one of the plurality of winding portions creates a path of near zero resistance between the at least one of the winding portions and at least another one of the winding portions.

23. An active variable frequency wind turbine for providing outputs to variable frequency loads, the wind turbine comprising:
an electrical output device, the electrical output device producing a variable frequency AC output depending on device speed;
at least one wind driven blade operatively coupled to the electrical output device, wherein variable movement of the at least one wind driven blade produces AC output from the coupled electrical output device;
an AC to DC converter coupled to the electrical output device;
a DC to AC converter coupled to the AC to DC converter, the DC to AC converter being coupled to a load;
a controller coupled to the DC to AC converter, the controller being capable of controlling the DC to AC converter to vary output from the DC to AC converter depending on an output selection for the load coupled to the DC to AC converter;
a housing that houses the electrical output device and the AC to DC converter;
a wind turbine sensor coupled to the controller, wherein the controller controls operation of the wind turbine as function of input received by the wind turbine sensor; and
a shutdown switch coupled to each of a plurality of winding portions of the electrical output device, the shutdown switch being capable of increasing current based torque opposing operation of the wind turbine.

24. The wind turbine of claim 23, wherein the load is variable, the wind turbine further comprising:
a sensor for sensing the load;
wherein the output from the DC to AC converter varies with the varied load.

25. The wind turbine of claim 24, wherein the load comprises a transformer.

26. The wind turbine of claim 25, wherein the AC to DC converter is a rectifier.

27. The wind turbine of claim 26, wherein the load is a battery.

28. The wind turbine of claim 23, wherein the electrical output device is an alternator.

29. The wind turbine of claim 23, wherein the electrical output device is a single phase device.

30. The wind turbine of claim 23, wherein the electrical output device is a poly phase device.

31. The wind turbine of claim 30, wherein the wind turbine is stall regulated.

32. The wind turbine of claim 31, wherein the wind turbine is stall regulated under a predetermined condition.

33. The wind turbine of claim 32, wherein the predetermined condition is selected from a group consisting of a predetermined blade movement speed, a power output limit, and a startup condition.

34. The wind turbine of claim 23, wherein the electrical output device has a velocity, and wherein the wind turbine sensor senses at least one selected characteristic from a group consisting of revolutions per minute of the at least one wind driven blade, velocity of the wind, and the power output of the electrical output device.

* * * * *

UNITED STATES PATENT AND TRADEMARK OFFICE
CERTIFICATE OF CORRECTION

PATENT NO. : 8,018,081 B2
APPLICATION NO. : 11/487392
DATED : September 13, 2011
INVENTOR(S) : Calley et al.

It is certified that error appears in the above-identified patent and that said Letters Patent is hereby corrected as shown below:

Title Page, Item (12) "Calley" should read -- Calley, et al. --.

Title Page, Item (75) Inventor is corrected to read:
-- David Gregory Calley, Flagstaff (AZ);
Michael G. Clifton, Flagstaff (AZ) --.

Signed and Sealed this
Fifth Day of July, 2016

Michelle K. Lee
*Director of the United States Patent and Trademark Office*